United States Patent
Miura

(10) Patent No.: US 11,364,669 B2
(45) Date of Patent: Jun. 21, 2022

(54) SURFACE PROTECTION METHOD AND SURFACE DECORATION METHOD FOR BODY TO BE COATED

(71) Applicants: FU-SE VACUUM FORMING CO., LTD., Osaka (JP); Claudia Khalil, Heidelberg (DE)

(72) Inventor: Takayuki Miura, Habikino (JP)

(73) Assignees: FU-SE VACUUM FORMING CO., LTD., Osaka (JP); Claudia Khalil, Heidelberg (DE)

( * ) Notice: Subject to any disclaimer, the term of this patent is extended or adjusted under 35 U.S.C. 154(b) by 16 days.

(21) Appl. No.: 16/816,133

(22) Filed: Mar. 11, 2020

(65) Prior Publication Data

US 2020/0207005 A1 Jul. 2, 2020

Related U.S. Application Data

(63) Continuation of application No. 15/575,267, filed as application No. PCT/JP2016/064950 on May 19, 2016, now Pat. No. 11,148,345.

(30) Foreign Application Priority Data

May 19, 2015 (JP) .............................. JP2015-101454

(51) Int. Cl.
*B29C 51/10* (2006.01)
*B29C 51/12* (2006.01)
(Continued)

(52) U.S. Cl.
CPC .............. *B29C 51/10* (2013.01); *B29C 51/12* (2013.01); *B29C 51/16* (2013.01); *B32B 7/12* (2013.01);
(Continued)

(58) Field of Classification Search
CPC ......... B29C 51/10; B29C 51/16; B29C 51/12; B29C 51/08; B29C 51/422; B29C 51/262;
(Continued)

(56) References Cited

U.S. PATENT DOCUMENTS

| 5,127,974 A | 7/1992 | Tomiyama et al. |
| 10,076,889 B2 | 9/2018 | Sakamoto et al. |

(Continued)

FOREIGN PATENT DOCUMENTS

| CN | 102202882 A | 9/2011 |
| EP | 0251546 B1 | 3/1992 |

(Continued)

OTHER PUBLICATIONS

The extended European search report issued by the European Patent Office dated Dec. 6, 2018, which corresponds to European Patent Application No. 16796580.5-1014 and is related to U.S. Appl. No. 16/816,133.

(Continued)

*Primary Examiner* — Jeffry H Aftergut
*Assistant Examiner* — Christopher W Raimund
(74) *Attorney, Agent, or Firm* — Studebaker & Brackett PC

(57) ABSTRACT

[Problem] To suppress changes in the recess depth and shape of a three-dimensional molded shape, and to form a uniform protective layer or ornamental layer along the surface of the molded shape. Also, to provide uniform application to the entire irregularly-formed surface and to suppress air pockets and partial defects of bonding. [Solution] In an adherend W having a three-dimensional molded portion in which a plurality of concavities and/or convexities are molded in a regular arrangement, a thermoplastic coating film larger than the area of an adhesion region is integrally adhered by a three dimensional decorative molding procedure in a pre- (Continued)

determined adhesion region that includes the three-dimensional molded portion. The predetermined adhesion region includes all of the three-dimensional molded portion and covers more than half the perimeter of the adherend W in center cross-sectional view.

28 Claims, 19 Drawing Sheets

(51) Int. Cl.
| | | |
|---|---|---|
| B62D 37/02 | (2006.01) | |
| B29C 51/16 | (2006.01) | |
| B32B 7/12 | (2006.01) | |
| B32B 37/10 | (2006.01) | |
| B29C 51/08 | (2006.01) | |
| B29K 105/00 | (2006.01) | |
| B29C 51/42 | (2006.01) | |
| B29C 51/26 | (2006.01) | |
| B29L 31/00 | (2006.01) | |
| B29C 51/14 | (2006.01) | |
| B29L 31/30 | (2006.01) | |

(52) U.S. Cl.
CPC .......... *B32B 37/1009* (2013.01); *B62D 37/02* (2013.01); *B29C 51/08* (2013.01); *B29C 51/14* (2013.01); *B29C 51/262* (2013.01); *B29C 51/422* (2013.01); *B29C 2791/006* (2013.01); *B29K 2105/0097* (2013.01); *B29L 2031/3055* (2013.01); *B29L 2031/722* (2013.01); *B29L 2031/768* (2013.01); *B32B 2605/08* (2013.01)

(58) Field of Classification Search
CPC ..... B29C 51/14; B29C 2791/006; B32B 7/12; B32B 37/1009; B32B 2605/08; B32B 3/266; B62D 37/02; B29K 2105/0097; B29L 2031/722; B29L 2031/3055; B29L 2031/768; B29B 7/12
See application file for complete search history.

(56) References Cited

U.S. PATENT DOCUMENTS

| | | | |
|---|---|---|---|
| 2002/0129634 A1 | 9/2002 | Pierson et al. | |
| 2010/0163155 A1* | 7/2010 | Suzuki | B29C 51/425 156/64 |
| 2010/0330329 A1* | 12/2010 | Salaverry | B62D 35/00 428/131 |
| 2011/0229681 A1 | 9/2011 | Sakamoto et al. | |
| 2013/0008591 A1 | 1/2013 | Kondo | |
| 2013/0220539 A1 | 8/2013 | Takenouchi et al. | |

FOREIGN PATENT DOCUMENTS

| | | |
|---|---|---|
| JP | S63-25020 A | 2/1988 |
| JP | S63-125681 U | 8/1988 |
| JP | H05-293896 A | 11/1993 |
| JP | H08-11200 A | 1/1996 |
| JP | 2004-090535 A | 3/2004 |
| JP | 3999077 B2 | 10/2007 |
| JP | 2010-064448 A | 3/2010 |
| JP | 2012-096403 A | 5/2012 |
| JP | 2013-032609 A | 2/2013 |
| JP | 2014-073717 A | 4/2014 |
| WO | 2012/140496 A1 | 10/2012 |

OTHER PUBLICATIONS

An Office Action mailed by the National Intellectual Property Administration of the People's Republic of China dated Apr. 24, 2019, which corresponds to Chinese Patent Application No. 201680028896.1 and is related to U.S. Appl. No. 16/816,133; with English language translation.
An Office Action; "Notification of Reasons for Refusal," mailed by the Japanese Patent Office dated Feb. 5, 2019, which corresponds to Japanese Patent Application No. 2017-519407 and is related to U.S. Appl. No. 16/816,133; with English language translation.
An Office Action; "Notification of Reasons for Refusal," mailed by the Japanese Patent Office dated Jan. 28, 2020, which corresponds to Japanese Patent Application No. 2017-519407 and is related to U.S. Appl. No. 16/816,133; with English language translation.
International Search Report issued in PCT/JP2016/064950; dated Aug. 9, 2016.

\* cited by examiner

SURFACE PROTECTION METHOD AND SURFACE DECORATION METHOD FOR BODY TO BE COATED

CROSS-REFERENCE TO RELATED APPLICATIONS

This application is a Continuation of U.S. patent application Ser. No. 15/575,267 filed Nov. 17, 2017, which was the U.S. National Stage of International Application No. PCT/JP2016/064950 filed May 19, 2016, which claims benefit of priority to Japanese Patent Application No. 2015-101454 filed May 19, 2015, the entire content of which is incorporated herein by reference.

TECHNICAL FIELD

The present invention relates to a surface protection method and a surface decoration method for a body to be coated having a three dimensionally formed portion on a surface thereof where a plurality of recessed portions and/or projecting portions are formed in a regular array. The body to be coated includes an object which is used as a moving body which has an exposed surface and is movable, and an object which is used as a relative moving body which is not movable per se and has a surface on which a fluid flows. Further, the body to be coated includes an object which is used as an outer surface or an inner surface of a transport traveling body which transports human or physical objects. The body to be coated in the decoration method includes an object used as any one of the above-mentioned objects or a functional part which is not movable. Three dimensionally formed portion on which a plurality of recessed portions and/or projecting portions are formed in a regularly arranged manner includes a dimple formed portion where dimpled indentations which are partially spherical recessed portions are arranged regularly. Further, the body to be coated includes an object where a large number of dimple forming (recessed indentations) are formed on a surface of a moving body in order to reduce a dynamic frictional coefficient of a traveling body (automobile, motorcycle, ship, airplane) particularly.

BACKGROUND ART

Buildings and vehicles having a plurality of irregularities of predetermined shape have been disclosed as conventional fluid resistance reducing apparatuses (Refer to, for example, Patent document 1). Recessed portions and projecting portions in this document may be formed integrally with the apparatus, or a seal having the recessed portions and the projecting portions may be adhered to the apparatus. The fluid resistance reducing apparatus can suppress fluids such as air and water from entering toward a back surface of the apparatus to generate Karman vortex.

To protect the recessed portions and the projecting portions on the surface of the fluid resistance reducing apparatus, the whole surface of the apparatus, which includes the recessed portions and the projecting portions, may be subjected to dipping or blast painting. Alternatively, an irregular surface can be formed by adhering a sheet to a surface of an aero part having such recessed portions and projecting portions (Refer to, for example, Patent document 2).

PRIOR ART DOCUMENTS

Patent Documents

[Patent document 1] Japanese Unexamined Patent Publication No. 2014-73717

[Patent document 2] Utility Model Application Publication No. 63-125681

SUMMARY OF THE INVENTION

Problems to be Solved by the Invention

However, the surface protection obtained by conventional dipping or spray coating has a drawback on accumulation of a resin. When such a drawback occurs, a non-uniform protective layer is formed and hence, depths and shapes of indentations change.

Besides these techniques, there has been also disclosed conventionally an unevenness forming technique which performs surface protection by sheet lamination. However, this technique has a drawback that it is difficult to realize uniform lamination. This technique also has drawbacks such as accumulation of air or a sticking failure part. Particularly, the technique has a drawback that, after a film is laminated on an object, the laminated sheet is liable to be peeled off at an end portion of a recessed portion, at an end portion of a three dimensionally formed portion having a recessed portion or at an end portion of a plate surface having a three dimensionally formed portion due to the difference in shrinkage ratio between the film and the body to be coated or an internal stress generated in the film.

Accordingly, it is the task of the present invention to form a uniform protective layer or a uniform decoration layer along a surface having a formed shape by suppressing a change in depth and shape of indentations having a three dimensionally formed shape. It is another task of the present invention to suppress drawbacks on accumulation of air and a sticking failure part by making the lamination uniform over the whole unevenly formed surface. More particularly, it is the task of the present invention to suppress the peeling off of a laminated sheet due to the difference in shrinkage ratio between a film and a body to be coated or an internal stress generated in the film at an end portion of a recessed portion, at an end portion of a three dimensionally formed portion having a recessed portion, and at an end portion of a plate surface having a three dimensionally formed portion.

Solutions to the Problems

To overcome the above-mentioned tasks, a surface protection method for a body to be coated according to the present invention provides the following means (1) to (5). Further, a surface decoration method for a body to be coated according to the present invention provides the following means (6) to (10).

(1) The present invention is directed to a surface protection method for a body to be coated where a body to be coated (W) has a three dimensionally formed portion on which a plurality of recessed portions and/or projecting portions are formed in a regularly arranged manner, and to a predetermined sticking region including the three dimensionally formed portion, a thermoplastic coating film having a larger area than the sticking region is integrally stuck in accordance with steps of a three dimension over-lay method, wherein the predetermined sticking region includes the whole three dimensionally formed portion and extends throughout an over half periphery of the body to be coated (W) in a center cross-sectional view, and the steps of the three dimension over-lay method are performed such that the body to be coated is accommodated in one of contiguously formed spaces partitioned by a coating film, the body to be coated is arranged such that the sticking region is integrally exposed, the insides of both contiguously formed spaces are brought into a pressure reduced state and, thereafter, the other space where the body to be coated is not accommodated is released to an atmospheric pressure thus sticking the coating film onto a surface of the body to be coated whereby the coating film is integrally stuck throughout the over half periphery of the body to be coated including the sticking region in a cross-sectional view.

Here, "the coating film is integrally stuck throughout the over half periphery of the body to be coated (W) in a cross-sectional view" of the present invention means the state where one coating film is stuck so as to contiguously cover the over half periphery of the whole peripheral surface extending from a front surface to a back surface of the body to be coated (W) (closed figure). That is, in a cross-sectional view crossing the center of the surface of the three dimensionally formed portion, the whole peripheral surface extending from the front surface to the back surface of the body to be coated (W) (the front surface, the back surface, and left and right side surfaces contiguously formed with left and right sides of the front and back surfaces) is represented as a closed trace line such as a flat rectangle or circle. The entire length of the trace line is defined as a "entire cross-sectional peripheral length", and the length of the trace line in a stuck range of the coating film which is stuck to the surface of the body to be coated (W) so as to integrally cover the body to be coated (W) is defined as a "entire cross-sectional sticking length". Here, the state where the "entire cross-sectional sticking length" exceeds a half of the "entire cross-sectional peripheral length" is defined as the state where "the coating film is stuck throughout the over half periphery of the body to be coated (W) in a cross-sectional view". For example, as illustrated in FIGS. 4 to 5B, when the integral stuck range of the coating film extends from the front surface of the body to be coated (W) to both side surfaces contiguously formed with the front surface to left and right, or extends from at least one side surface of the body to be coated (W) to the back surface, it is regarded as the state where "the coating film is stuck throughout the over half periphery of the body to be coated (W) in a cross-sectional view". On the contrary, when the integral stuck range of the coating film do not extend to any side surface contiguously formed with the front surface to left and right, but extends to only a portion of the front surface appearing in the cross section, it cannot be regarded as the state where "the coating film is stuck throughout the over half periphery of the body to be coated (W) in a cross-sectional view".

(2) In the above-mentioned surface protection method for a body to be coated, for example, it is preferable that the body to be coated (W) is a moving body having a curved plate-shaped portion and with movement during use, the three dimensionally formed portion is configured such that a plurality of dimpled indentations are formed in an array in an exposed manner on a portion of a plate surface of the curved plate shaped portion of the body to be coated (W) which receives fluid frictional resistance during the movement of the moving body, and the sticking region to which the coating film is stuck is a continuous face region which includes the plate surface, a plate side surface contiguously formed with a peripheral portion of the plate surface and a portion of a plate back surface contiguously formed with the plate side surface.

(3) In the steps of the three dimension overlay method, for example, it is preferable that, the contiguously formed spaces are formed above and below the coating film with the coating film stretched in a lateral direction set as a boundary, the body to be coated is accommodated in a lower accommodating space which is a lower part of the contiguously formed spaces, and an upper accommodating space which is an upper part of the contiguously formed spaces is released to an atmospheric pressure, a predetermined heat quantity is applied to the coating film (F) before the upper accommodating space is released to the atmospheric pressure such that the coating film is brought into a drawn down state where the coating film approaches the three dimensionally formed portion of the body to be coated, the coating film (F) is brought into a stuck state with the body to be coated by a pressure difference between sealed spaces above and below the coating film from the drawn down state, and a heat quantity (t1) applied to a part (center area A1) to be stuck of the coating film (F) in a drawn down state which is stuck on a center portion of the three dimensionally formed portion is set lower than a heat quantity (t2) applied to a part (peripheral area A2) to be stuck of the coating film in a drawn down state which is stuck on a peripheral portion of the three dimensionally formed portion.

With such configuration, the stretch amount in the sticking step of overlay can be variably adjusted using the center area A1 and the peripheral area A2 of the coating film. Specifically, in the peripheral portion requiring a stretched area, the coating film is stuck while being stretched relatively large, and in the center portion requiring reliable sticking, the coating film has a predetermined thickness, enabling reliable sticking without substantially deforming the projecting portions or recessed portions. In particular, peeling of the coating film can be prevented by stretching the coating film to be thin in the peripheral portion.

(4) In the above-mentioned surface protection method for a body to be coated, for example, it is preferable that the steps of the three dimension over-lay method include at least the following steps (A), (B), (C), and (D).

(A) sealing step: the step of hermetically forming the contiguously formed spaces in such a manner that a lower chamber (21) which has a lower accommodating space (S21) having an upper portion thereof opened and accommodates the body to be coated (W) in the lower accommodating space (S21) and an upper chamber (22) which has an upper accommodating space (S22) having a lower portion thereof opened are vertically combined with each other in a state where the coating film (F) having a size enabling the coating film (F) to cover both openings thus contiguously forming the upper and lower accommodating spaces S21, S22, (B) lifting up step: the step of holding the body to be coated (W) accommodated in the accommodating space (S21) in a contact manner by a holding portion which is away from both of the sticking region including the three dimensionally formed portion and a side peripheral portion contiguously formed with a peripheral edge portion of the sticking region, and lifting up the body to be coated (W) toward an upper accommodating space side by driving the holding portion, (C) pressure reducing and drawing down step: the step of reducing a pressure in the lower accommodating space (S21) of the sealed contiguously formed spaces and a pressure in the upper accommodating space (S22) of the sealed contiguously formed spaces while holding the pressure in the lower accommodating space (S21) and the pressure in the upper accommodating space (S22) at the same pressure, and bringing the coating film (F) into a drawn down state by application of a predetermined heat quantity to the coating film (F), and bringing an uppermost portion of the sticking region of the body to be coated which is lifted up by the holding portion into a state where uppermost portion approaches closest to a center portion of the stretched coating film, and (D) sticking step: the step of integrally sticking the coating film (F) to the sticking region or the side peripheral portion of the body to be coated (W) by releasing only the inside of the upper accommodating space (S22) into an atmospheric pressure out of the upper and lower accommodating spaces whose pressures are reduced.

To solve the above problem, the surface decoration method for the body to be coated according to the present invention has following features (1) to (5).

(5) In the surface protection method for the body to be coated, for example, it is preferable that, a plurality of thickness varied portions which are formed into a partially circular shape with a thickness smaller and larger than thickness of other portions are preliminarily formed at least at the part to be stuck of the coating film before sticking, and the thickness varied portions are formed with a space in a regular interval at a pitch equal to or smaller than a formation pitch of dimples adjacent to each other of the three dimensionally formed portion.

(6) The present invention is directed to a surface decoration method for a body to be coated where a body to be coated (W) has a three dimensionally formed portion on which a plurality of indentations are formed in a regularly arranged manner, and to a predetermined sticking region including the three dimensionally formed portion, a thermoplastic coating film having a larger area than the sticking region is integrally stuck in accordance with steps of a three dimension over-lay method, wherein the predetermined sticking region includes the whole three dimensionally formed portion and extends throughout an over half periphery of the body to be coated (W) in a center cross-sectional view, and the steps of the three dimension over-lay method are performed such that the body to be coated is accommodated in one of contiguously formed spaces partitioned by a coating film, the body to be coated is arranged such that the sticking region is integrally exposed, the insides of both contiguously formed spaces are brought into a pressure reduced state and, thereafter, the other space where the body to be coated is not accommodated is released to an atmospheric pressure thus sticking the coating film onto a surface of the body to be coated whereby the coating film is integrally stuck throughout the over half periphery of the body to be coated including the sticking region in a cross-sectional view.

(7) In the above-mentioned surface decoration method for a body to be coated, for example, it is preferable that the body to be coated (W) is a moving body having a curved plate-shaped portion and with movement during use, the three dimensionally formed portion is configured such that a plurality of dimpled indentations are formed in an array in an exposed manner on a portion of a plate surface of the curved plate shaped portion of the body to be coated (W) which receives fluid frictional resistance during the movement of the moving body, and the sticking region to which the coating film is stuck is a continuous face region which includes the plate surface, a plate side surface contiguously formed with a peripheral portion of the plate surface and a portion of a plate back surface contiguously formed with the plate side surface.

(8) In the surface decoration method for the body to be coated, for example, it is preferable that, in the steps of the three dimension overlay method, the contiguously formed spaces are formed above and below the coating film with the coating film stretched in a lateral direction set as a boundary, the body to be coated is accommodated in a lower space which is a lower part of the contiguously formed spaces, and an upper space which is an upper part of the contiguously formed spaces is released to an atmospheric pressure, a predetermined heat quantity is applied to the coating film (F) before the upper space is released to the atmospheric pressure such that the coating film (F) in the contiguously formed spaces is brought into a drawn down state where the coating film (F) approaches the three dimensionally formed portion of the body to be coated, the coating film (F) is brought into a stuck state with the body to be coated by a pressure difference between sealed spaces above and below the coating film from the drawn down state, and a heat quantity (t1) applied to a part to be stuck (center area A1) of the coating film (F) in a drawn down state which is stuck on a center portion of the three dimensionally formed portion is set lower than a heat quantity (t2) applied to a part to be stuck (peripheral area A2) of the coating film (F) in a drawn down state which is stuck on a peripheral portion of the three dimensionally formed portion.

(9) In the above-mentioned surface decoration method for a body to be coated, for example, it is preferable that the steps of the three dimension over-lay method include at least the following steps (A), (B), (C), and (D).

(A) sealing step: the step of hermetically forming the contiguously formed spaces in such a manner that a lower chamber (21) which has a lower accommodating space (S21) having an upper portion thereof opened and accommodates the body to be coated (W) in the lower accommodating space (S21) and an upper chamber (22) which has an upper accommodating space (S22) having a lower portion thereof opened are vertically combined with each other in a state where the coating film (F) having a size enabling the coating film (F) to cover both openings thus contiguously forming the upper and lower accommodating spaces S21, S22, (B) lifting up step: the step of holding the body to be coated (W) accommodated in the accommodating space (S21) in a contact manner by a holding portion which is away from both of the sticking region including the three dimensionally formed portion and a side peripheral portion contiguously formed with a peripheral edge portion of the sticking region, and lifting up the body to be coated (W) toward an upper accommodating space side by driving the holding portion.

(C) pressure reducing and drawing down step: the step of reducing a pressure in the lower accommodating space (S21) of the sealed contiguously formed spaces and a pressure in the upper accommodating space (S22) of the sealed contiguously formed spaces while holding the pressure in the lower accommodating space (S21) and the pressure in the upper accommodating space (S22) at the same pressure, and bringing the coating film (F) into a drawn down state by application of a predetermined heat quantity to the coating film (F), and bringing an uppermost portion of the sticking region of the body to be coated which is lifted up by the holding portion into a state where uppermost portion approaches closest to a center portion of the stretched coating film, and (D) sticking step: the step of integrally sticking the coating film (F) to the sticking region or the side peripheral portion of the body to be coated (W) by releasing only the inside of the upper accommodating space (S22) into an atmospheric pressure out of the upper and lower accommodating spaces whose pressures are reduced.

(10) In the above-mentioned surface decoration method for a body to be coated, for example, it is preferable that a plurality of thickness varied portions which are formed into a partially circular shape with a thickness smaller or larger than thicknesses of other portions are preliminarily formed at least at the part to be stuck of the coating film before sticking, and the thickness varied portions are formed with a space in a regular interval at a pitch equal to or smaller than a formation pitch of dimples adjacent to each other of the three dimensionally formed portion.

(Manner of Operation and Effects According to (2) to (5) and (7) to (10))

A coating film is uniformly laminated on the whole laminating portion of a surface on which a plurality of recessed portions and/or projecting portions are formed in a regularly arranged manner by a three dimension over-lay method and hence, it is possible to form the uniform surface protective layer without largely changing the shape of the three dimensionally formed portion.

By integrally forming a portion which contiguously extends to a back surface of the plate member of the moving body on which dimples are formed by way of the peripheral side surfaces of the surface of the plate member by a three dimension over-lay method, it is possible to avoid drawbacks such as accumulation of air or a sticking failure part caused by the lamination of the film on a three dimensional shape or the drawback that the film is liable to be peeled off at the end portion.

By changing a heat quantity in a drawn down state between the three dimensionally formed portion and the periphery of the three dimensionally formed portion, an adverse effect brought about by thinning of the periphery of the film can be suppressed and hence, a sticking failure part can be suppressed.

Effects of the Invention

According to the present invention, by adopting the above-mentioned means, the uniform protective layer or the uniform decoration layer can be formed along the surface of the formed shape by suppressing a change in depth and shape of indentations having a three dimensionally formed shape. Further, the film can be uniformly laminated over the whole uneven formed surface, and drawbacks on accumulation of air and a sticking failure part can be suppressed and hence, peeling off of the laminated film or sheet at each portion can be suppressed.

EMBODIMENTS OF THE INVENTION

Figure 1:
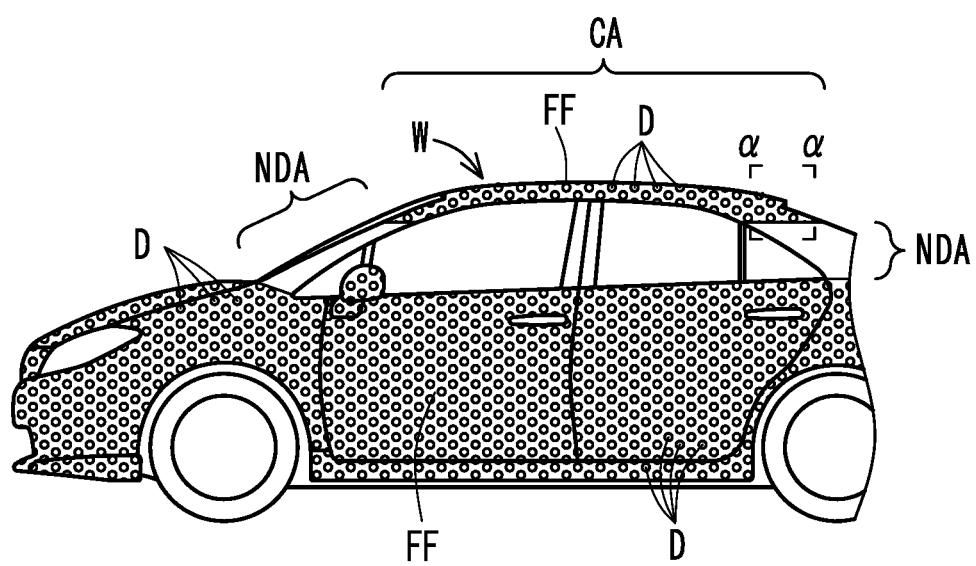
FIG. 1 is a view illustrating an appearance of a body to be coated, to which a surface protection or surface decoration method in Embodiment 1 is applied.

Embodiments that are examples for carrying out the present invention will be described below with reference to figures. According to a surface protection method or a surface decoration method of the present invention, a body to be coated (W) having a three dimensionally formed portion in which a plurality of recessed portions or/and projecting portions are formed in a regularly arranged manner is set as a target, a coating film (F) having an adhesive face (A) on a lower face thereof is stuck onto a predetermined sticking region exposed on the surface of the body to be coated (W) as the target, according to steps of a predetermined three dimension overlay method. However, the steps of the three dimension overlay method described herein refers to the technique of instantaneously sticking the coating film to the surface of the body to be coated in chambers by releasing pressure of one of the sealed chambers partitioned by the coating film, enabling three dimensional uniform surface protection or/and surface decoration without wrinkles, which would not be realized by manual film sticking or pressurized film sticking.

(Body to be Coated (W))

The body to be coated includes an object used as a moving body whose exposed surface is movable, an object used as a relative moving body which does not move, and on which fluid moves, and an object used as an outer surface or an inner surface of a transport travelling body that transports a person or an object. The body to be coated in the decoration method includes an object used as any one of the above-mentioned objects or a functional part which is not movable. Three dimensionally formed portion on which a plurality of recessed portions and/or projecting portions are formed in a regularly arranged manner includes a dimple formed portion where dimpled indentations which are partially spherical recessed portions are arranged regularly. Further, the body to be coated includes an object where a large number of dimple forming (recessed indentations) are formed on a surface of a moving body aiming at the reduction of a dynamic frictional coefficient of a traveling body (automobile, motorcycle, ship, airplane) particularly. In any case, the body to be coated has a three dimensionally formed portion, in which a plurality of recessed portions or/and projecting portions are formed in a regularly arranged manner, on an outer surface thereof. Applications of the body to be coated are not limited, and include, for example, moving bodies each having a curved plate-shaped portion and with movement during use, such as automobiles, trains, bicycles, airplanes, and ships, or moving equipment such as travelling component which has a curved plate-shaped portion and is moved by a driving mechanism during use.

Especially, the body to be coated embodied in embodiments is made of an exterior material configured by a plate configured by a plate-shaped portion (CA) in the moving body such as automobiles, trains, bicycles, airplanes, or ships which move during use.

Figure 2:
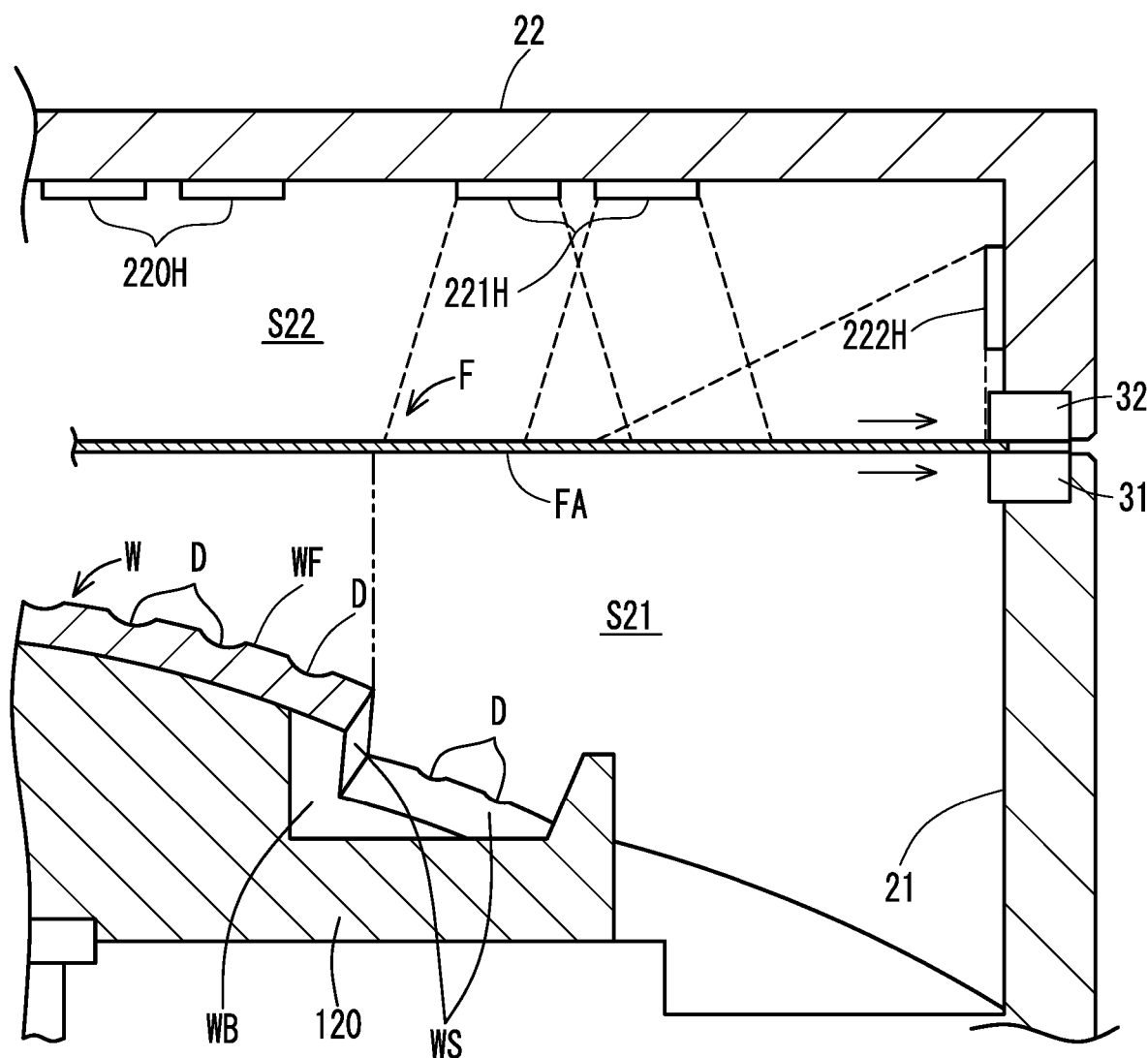
FIG. 2 is an enlarged sectional view illustrating a portion taken along a-a in FIG. 1 before sticking of a coating film.
Figure 3:
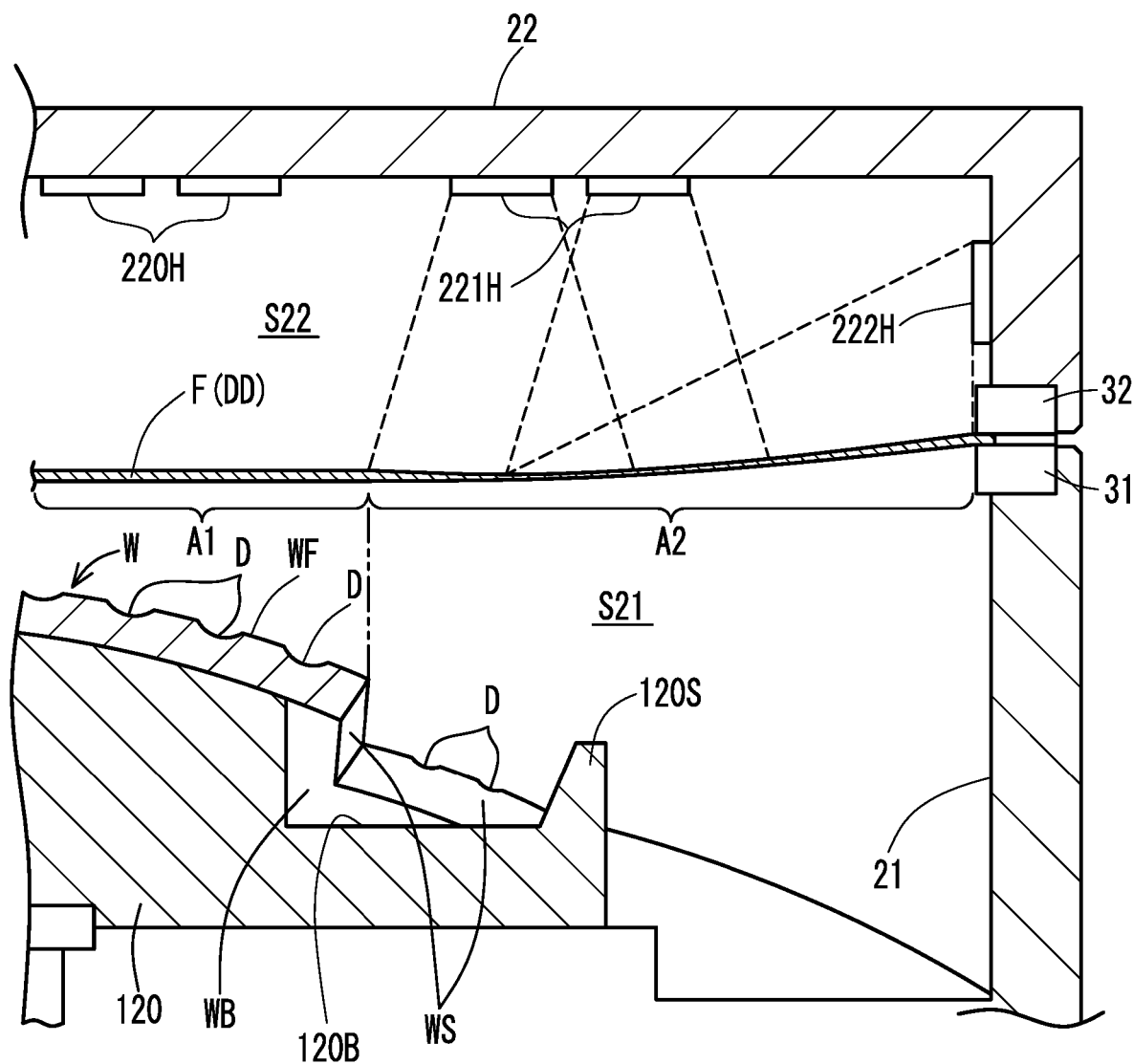
FIG. 3 is a partial view illustrating the portion taken along α-α in FIG. 1 in the set state and a drawn down state in a three dimensional overlay apparatus after sticking of the coating film.
Figure 5A:
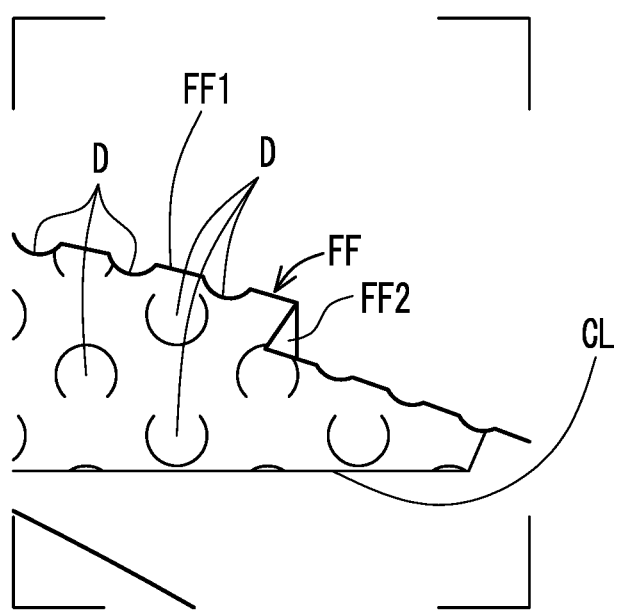
FIGS. 5A and 5B are an enlarged side view and an enlarged sectional view illustrating the state of the portion taken along α-α in Embodiment 1 in a finished state.
Figure 5B:
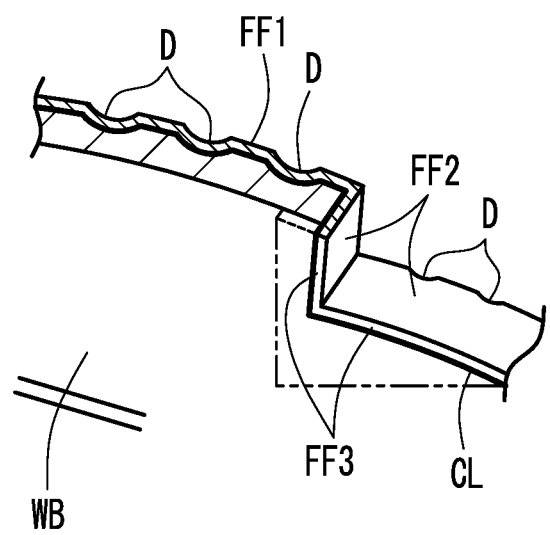
Figure 6:
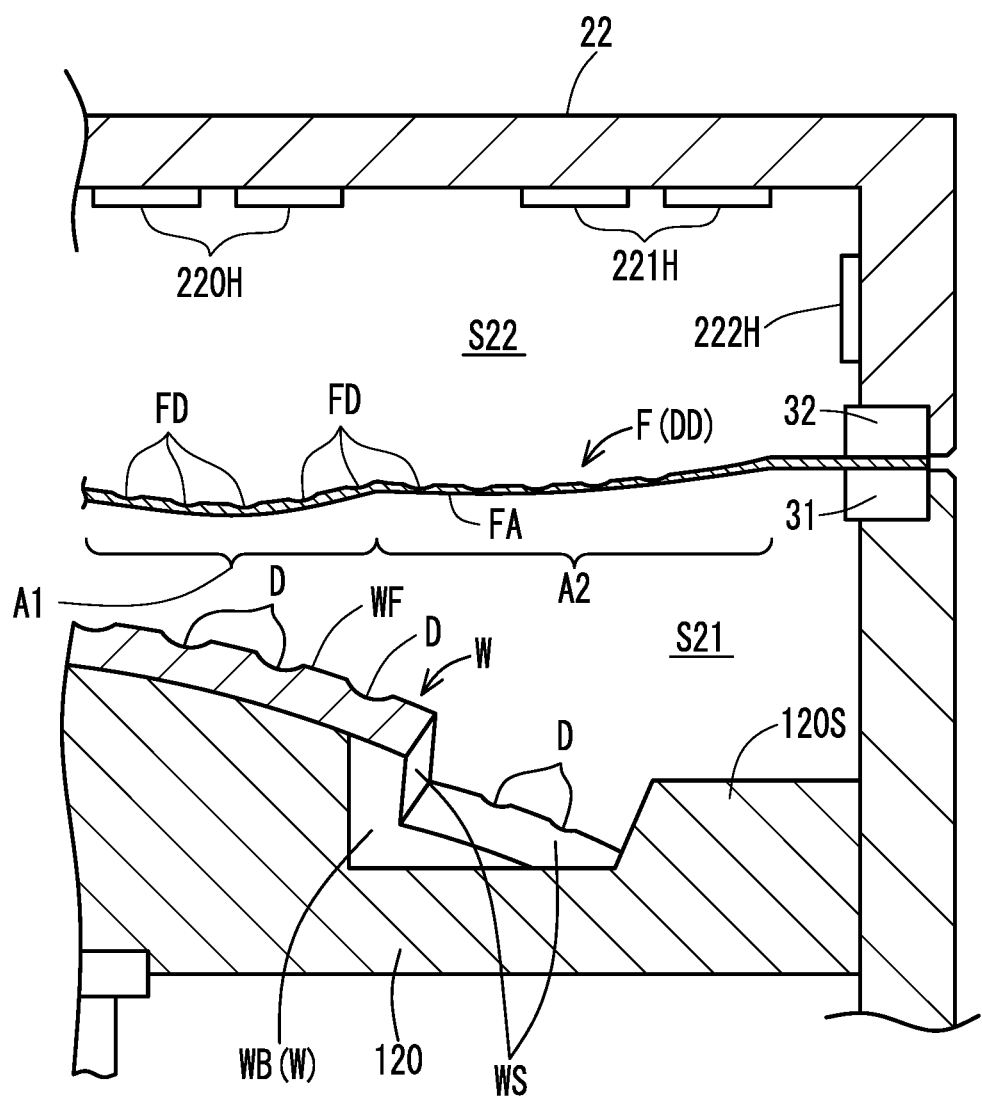
FIG. 6 is an enlarged sectional view illustrating a set state and a drawn down state before sticking of the coating film according to a surface protection or surface decoration method in Embodiment 2
Figure 7:
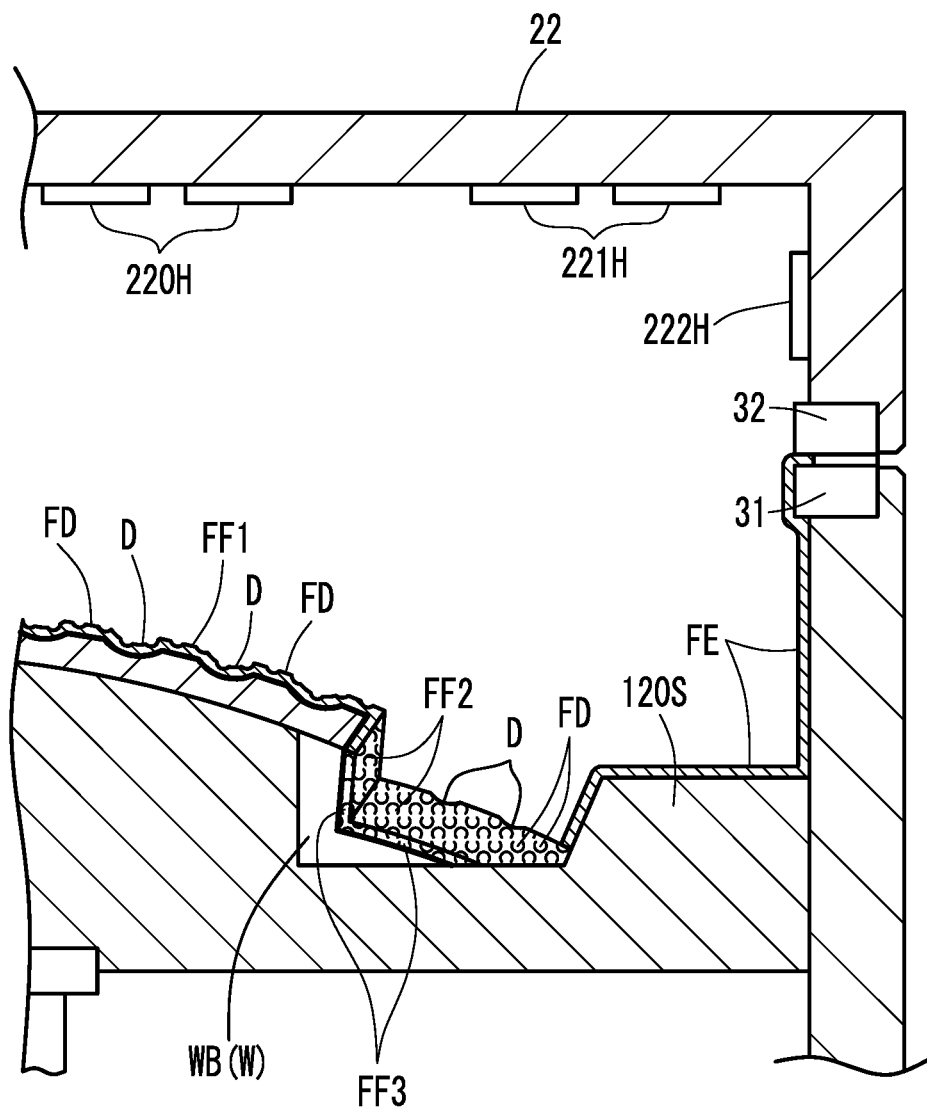
FIG. 7 is an enlarged sectional view illustrating a finished state after sticking of the coating film according to the surface protection or surface decoration method in Embodiment 2.
Figure 8:
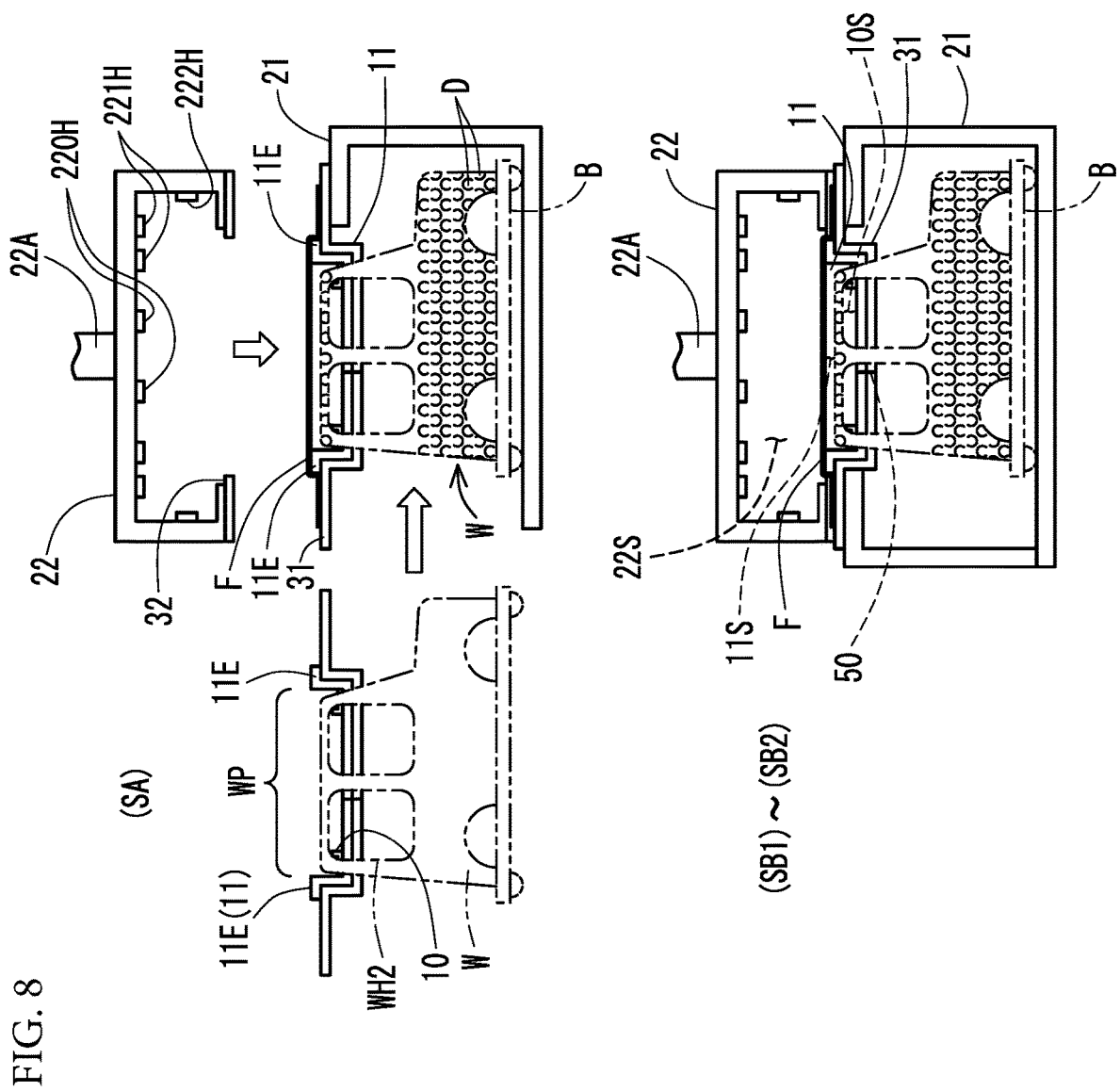
FIG. 8 shows sectional views illustrating a pre-set state (upper figure) and a post-set state (lower figure) according to a surface protection or surface decoration method in Embodiment 3.

A three dimensionally formed portion of the body to be coated (W) in Embodiment 1 has whole three dimensional outline formed of a combination of a plurality of surfaces, and thickness varied portions (D) having a plurality of recessed portions or/and projecting portions are formed in a regular arranged manner (FIG. 1 to FIG. 3). An example of the plurality of recessed portions formed in the regular arranged manner is dimpled structure in which, as illustrated in FIG. 5A, a plurality of partial (below one fourth) spherical indentations are arranged at regular intervals. Advantageously, the dimple structure is formed on a surface of a travelling body or moving equipment, generating a minute turbulent flow region in the surface causing fluid friction during travelling to reduce a surface friction resistance on a travelling surface or a moving surface. Also, on the three dimensionally formed portion of the body to be coated (W) in Embodiments 2 and 3, the thickness varied portions (D) having the plurality of recessed portions are formed in a regular arranged manner (FIG. 6 to FIG. 8).

Figure 13A:
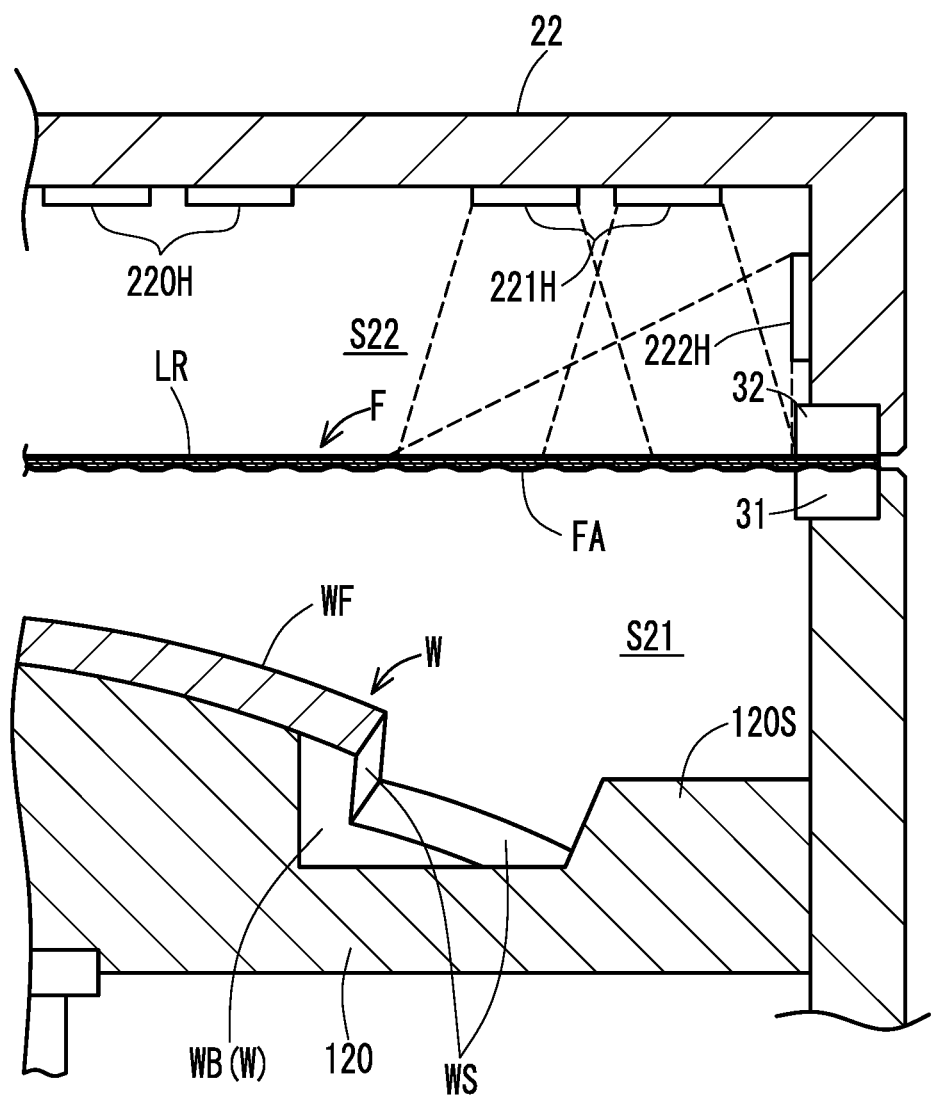
FIG. 13A is an enlarged sectional view illustrating a set state before sticking of the coating film according to the surface protection or surface decoration method in Embodiment 5.
Figure 13B:
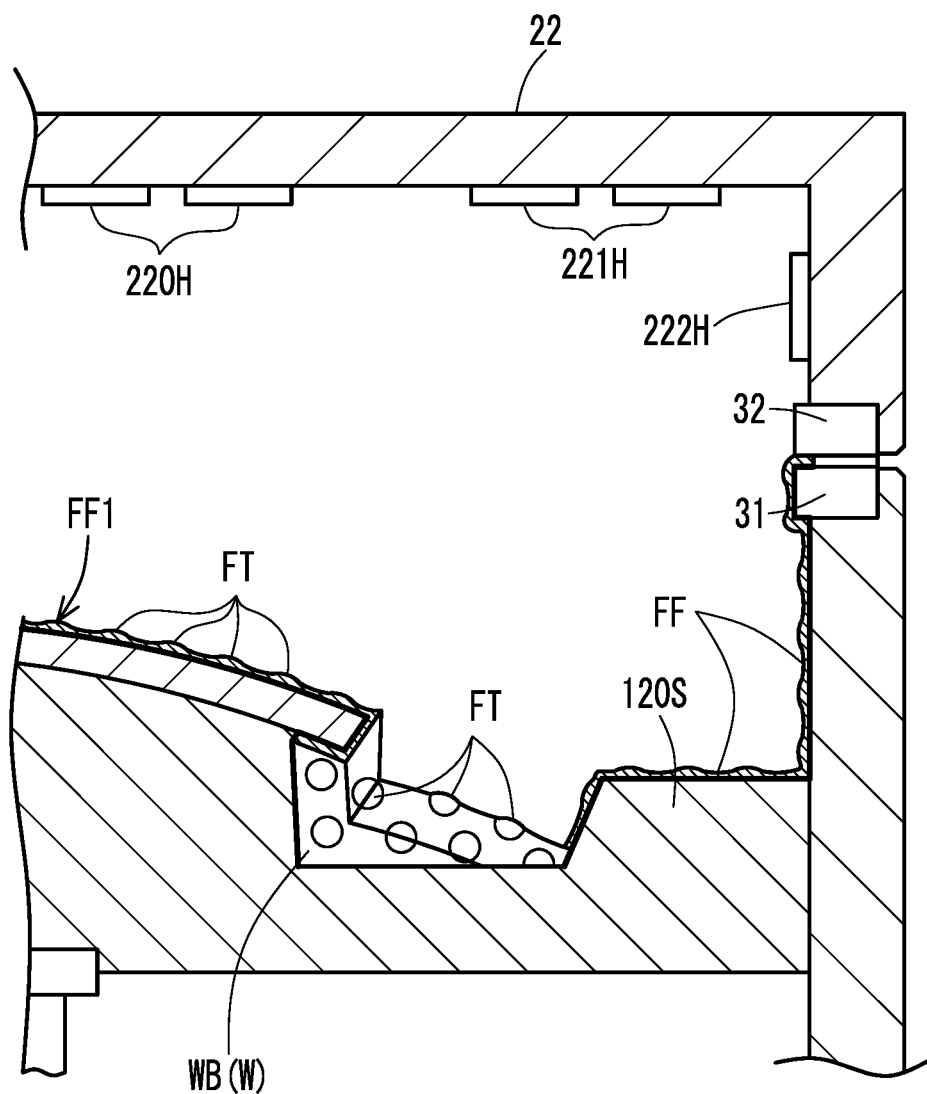
FIG. 13B is an enlarged sectional view illustrating s finished state after sticking of the coating film according to the surface protection or surface decoration method in Embodiment 5.
Figure 14:
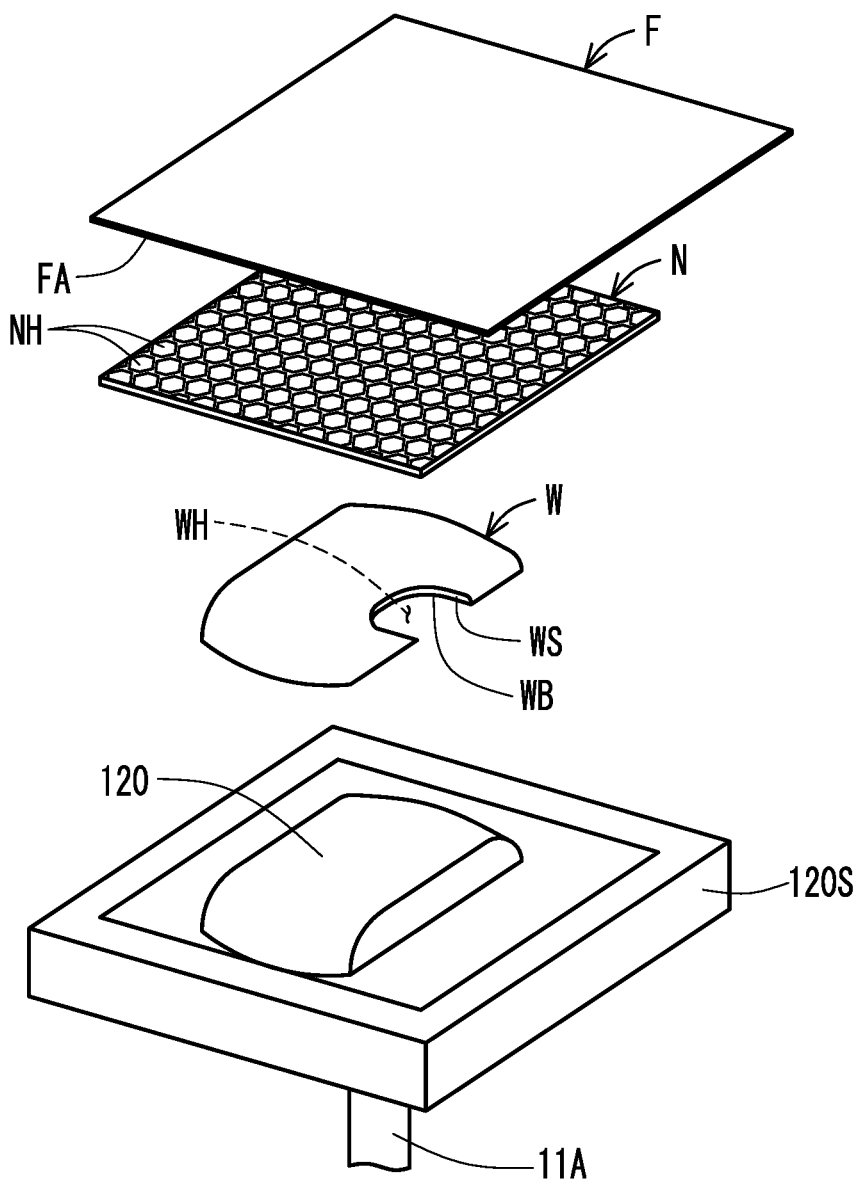
FIG. 14 is a view illustrating an apparatus in a pre-set state according to a surface protection or surface decoration method in Embodiment 6.

However, after performing the surface protection method or the surface decoration method of the present invention, the thickness varied portions (D) having the plurality of recessed portions or/and projecting portions may be formed on the body to be coated in a regular arranged manner. For example, in Embodiments 4 to 6, the three dimensionally formed portion of the unprocessed body to be coated has no thickness varied portion (D) on the surface thereof (FIG. 10. FIG. 13A, FIG. 14). However, in the steps of the three dimension overlay method, by employing the coating film having the thickness varied portions (D) formed of plurality of recessed portions or/and projecting portions (FIG. 10), or interposing the mesh sheet between the coating film and the surface of the body to be coated (FIG. 14, FIG. 15), the thickness varied portions (D) having the plurality of recessed portions are arranged according to the surface protection method or the surface decoration method of the present invention (FIG. 11, FIG. 13B, FIG. 16).

(Coating Film (F))

To protect, decorate, or protect and decorate the surface of the body to be coated (W), the coating film (F) is stuck to the sticking region of the surface of the body to be coated (W). The coating film (F) has a larger area than the sticking region of the body to be coated, and is brought into the three dimension overlay state where the coating film covers the surface of the body to be coated so as to include the whole sticking region of the body to be coated, and is stuck on the surface of the body to be coated. In the three dimension overlay state after sticking, the coating film is stuck throughout the over half periphery of the body to be coated including the sticking region in a center cross-sectional view. "Throughout the over half periphery of the body to be coated including the sticking region in a center cross-sectional view" means that, for example, when the whole plate front surface of the plate-shaped body to be coated (W) is a main region of the sticking region, the sticking region also includes the plate side surface, and a portion of the plate back surface. For example, as illustrated in FIG. 4, FIGS. 5A-5B, and FIG. 7, since one coating film (F) covers and is integrally stuck throughout the over half periphery of the body to be coated (W) in the center cross-sectional view, even when the three dimensionally formed portion including recessed portions, projecting portions, or both of them is included in the sticking region, adhesiveness or stability after sticking can be prevented from degrading due to the three dimensional shape.

Figure 9:
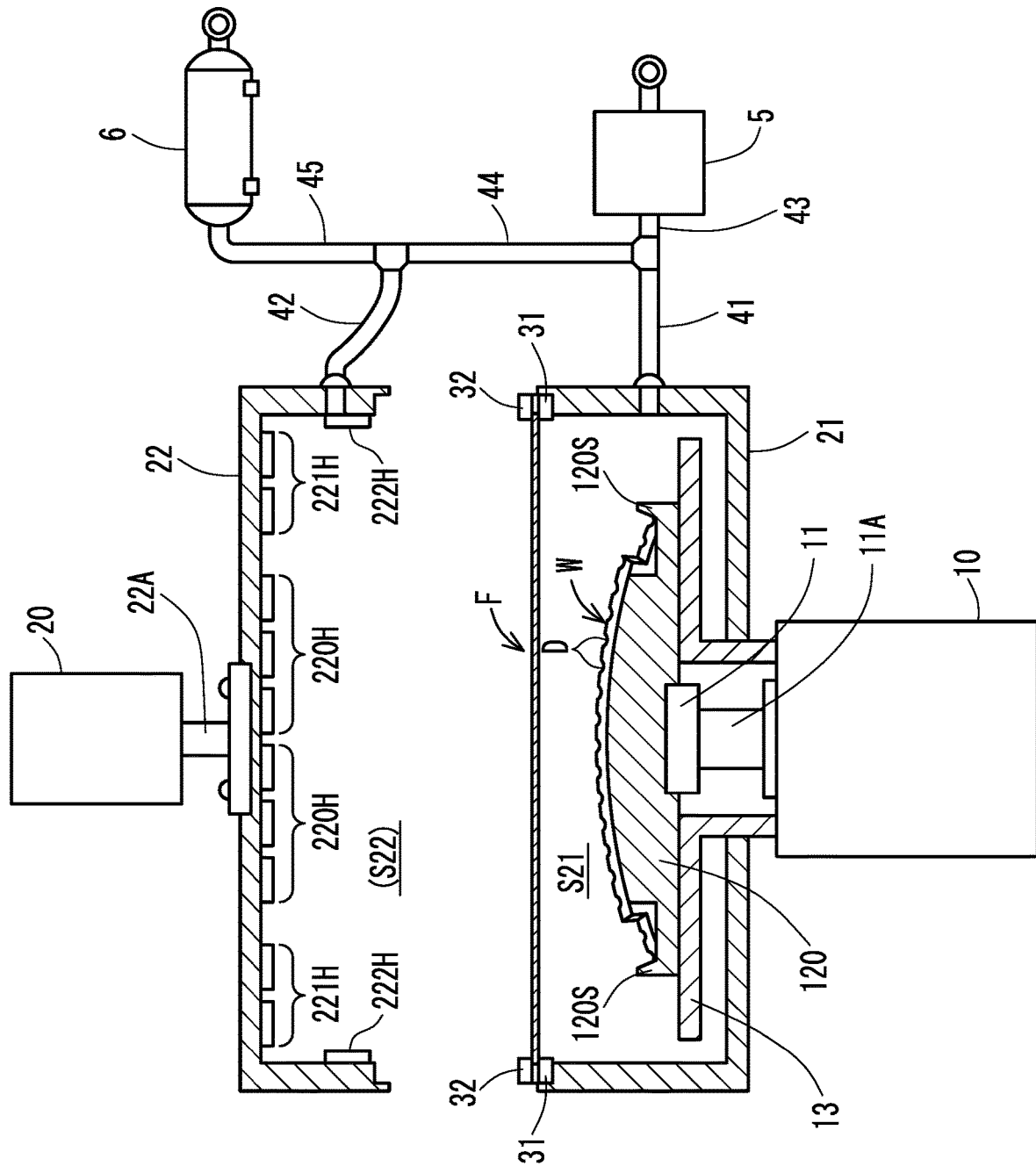
FIG. 9 is a view illustrating the apparatus in the pre-set state according to the surface protection or surface decoration method in Embodiment 1.
Figure 10:
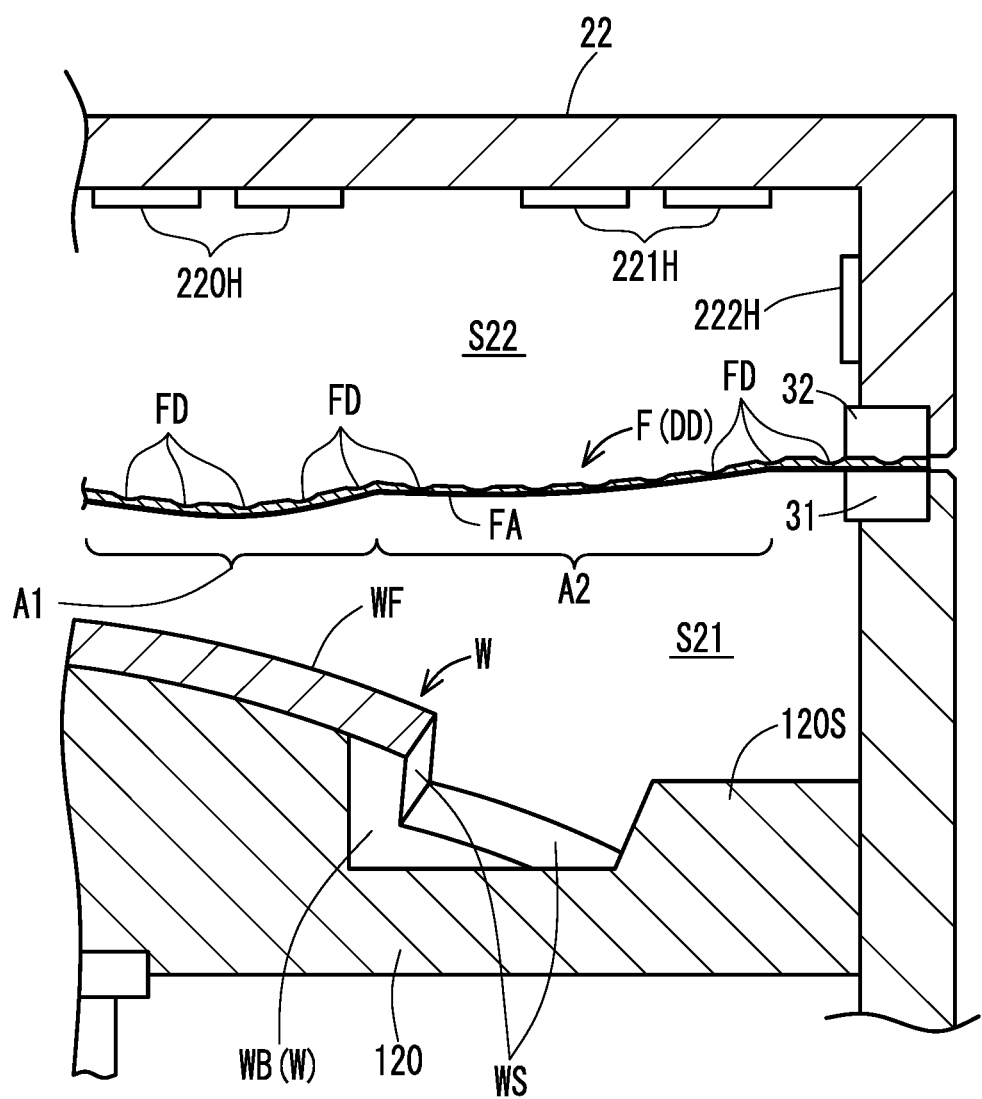
FIG. 10 is an enlarged sectional view illustrating a set state and a drawn down state according to a surface protection or surface decoration method in Embodiment 4.
Figure 11:
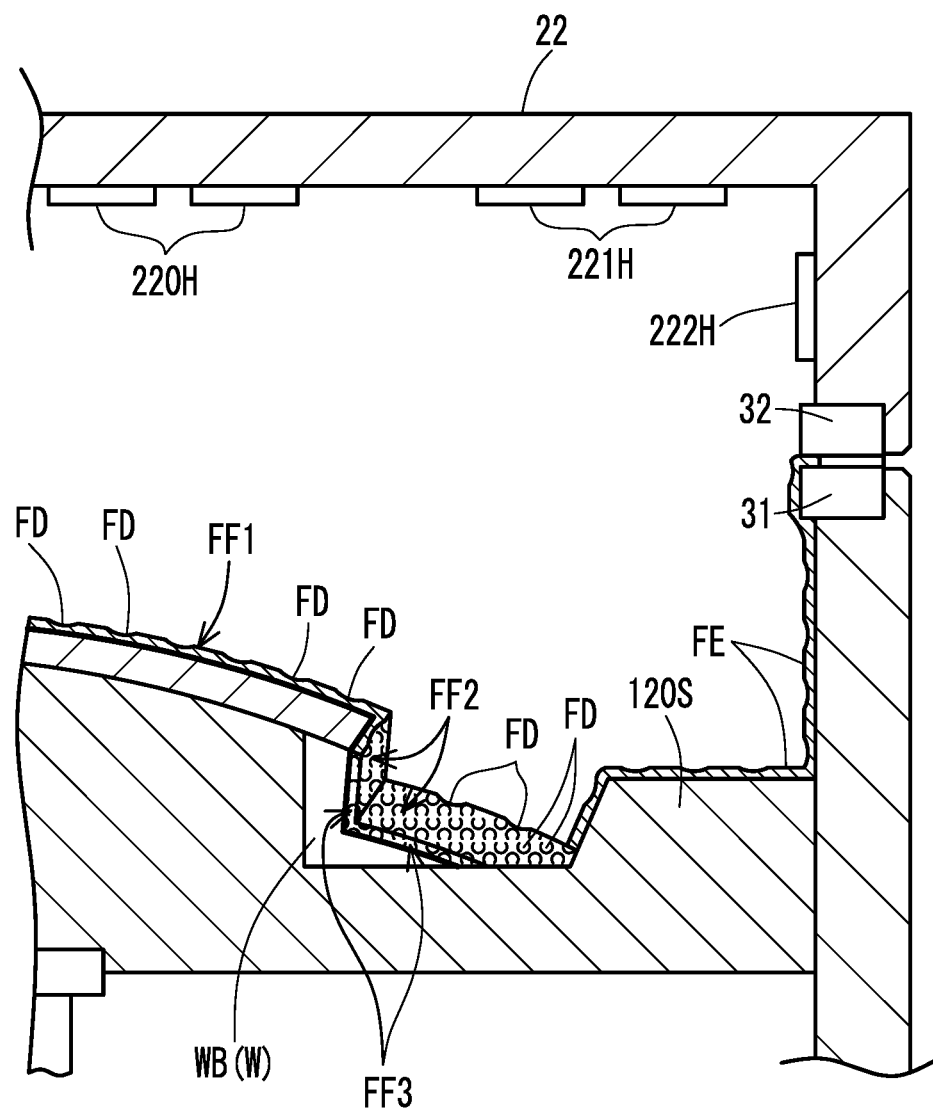
FIG. 11 is an enlarged sectional view illustrating a state after sticking of the coating film according to the surface protection or surface decoration method in Embodiment 4.
Figure 12A:
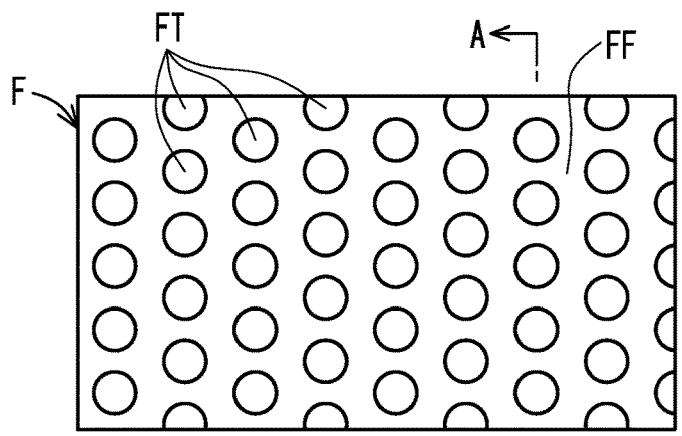
FIGS. 12A to 12C are partial enlarged views and sectional views of coating films used in a surface protection or surface decoration method in Embodiment 4 and Embodiment 5.
Figure 12A:
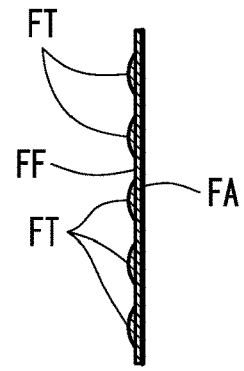
Figure 12B:
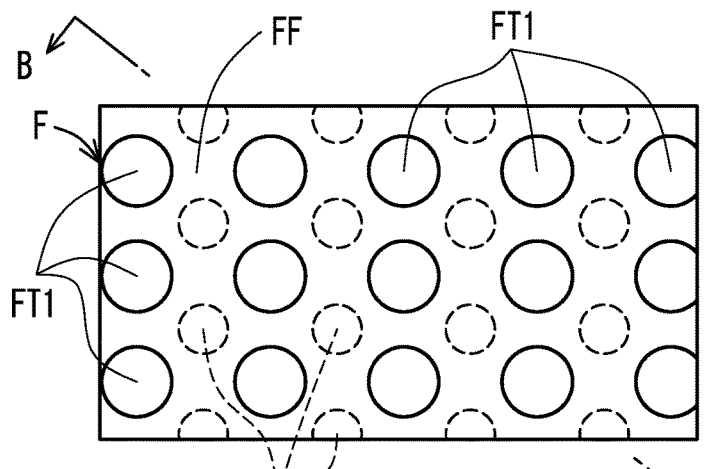
Figure 12B:
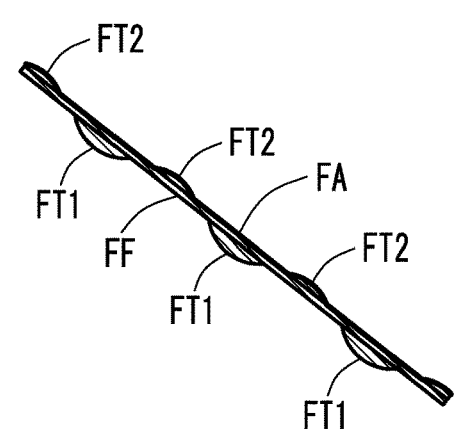
Figure 12C:
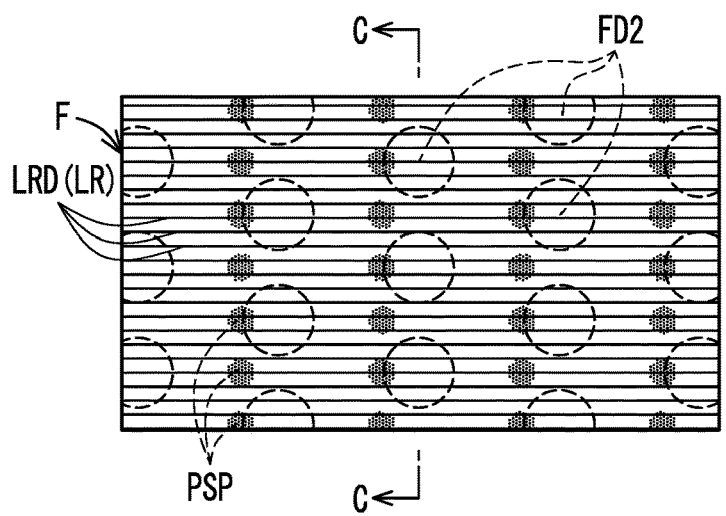
Figure 12C:
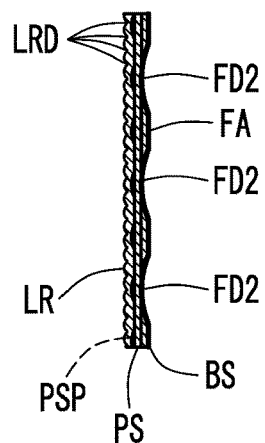

The coating film (F) may have a flat surface as in Embodiment 1 (FIG. 2, FIG. 9), or may have a plurality of recessed portions (FD) previously formed thereon in a regular arranged manner as in Embodiments 2, 4 (FIG. 6, 10, FIG. 12A). As in Embodiment 5, projecting portions (FA) or recessed portions FD2 may be formed on a lower surface in a regular arranged manner (FIG. 12B, FIG. 12C, and FIG. 13A). Further, as illustrated in FIG. 12C, transparent lenticular lenses (LR) each having a few µm are arranged on the surface using a parallel groove (LRD) therebetween, and a flat print sheet PS, on which a regular pattern PSP is printed, is inserted below the lenticular lenses LR such that an enlarged image FD2 three dimensionally showing the regular patterns PSP visually comes up on the surface of the coating film. The coating film (F) is configured by forming an adhesive face (A) below a base layer made of thermoplastic resin.

Figure 4:
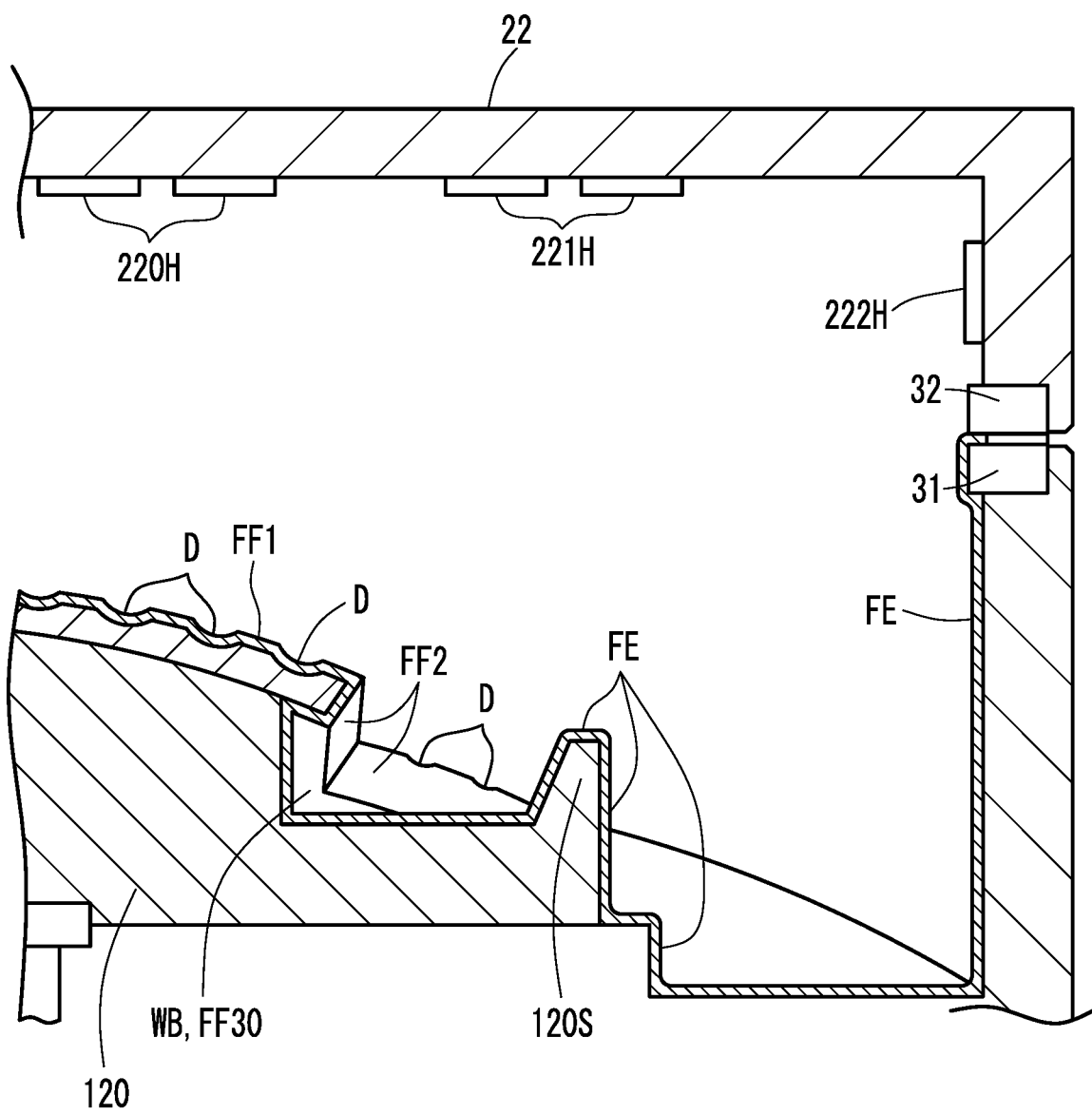
FIG. 4 is an enlarged sectional view illustrating the state of the portion taken along α-α in FIG. 1 after sticking of the coating film.

To stick the coating film (F), in the steps of the predetermined three dimension overlay method, first, an adhesive face (A), which includes A1 and A2, as the lower face of the coating film (F) is stretched into a flat face and set as opposed to the sticking region of the body to be coated (W) (FIG. 2, FIG. 13A, FIG. 15), is radiation-heated in the stretched state in a superimposed manner by heaters (center heaters (220H), peripheral heaters (221H), and a side heater (222H)) to bring the center area A1 and the peripheral area A2 into a drawn down state (FIG. 3, FIG. 6, and FIG. 10), and pressure in one of a film upper space and a film lower space is released from the stretched and drawn down state while the pressure in the film upper space and the pressure in the film lower space are held at the same atmospheric pressure. Then, the coating film is instantaneously stretched so as to move toward the sticking region of the surface of the body to be coated (W) and thus, to be three dimensionally stuck from the surface of the three dimensionally formed portion to the side surface and a portion of the back surface of the body to be coated (FIG. 4, FIG. 13B). After sticking, a front surface stuck part (FF1), a side surface stuck part (FF2), a back surface stuck part (FF30), and a remaining stuck part (FE) which covers a peripheral device are contiguously coated (FIG. 4, FIG. 16). Among the parts, the back surface stuck part (FF30) of the back surface is cut along a predetermined cut line (CL), and the cut back surface stuck part (FF30) and the remaining stuck part (FE) contiguously formed with the back surface stuck part are removed to coat only the front surface stuck part (FF1), the side surface stuck part (FF2), and a back surface cut stuck part (FF3) (FIGS. 5A-5B, FIG. 7, FIG. 11).

(Three Dimension Overlay Method)

Predetermined three dimension overlay method basically includes following steps of a so-called three dimension overlay method:

the body to be coated having the sticking region of the dimple (partial spherical indentation)-like three dimensionally formed portion is accommodated in one of sealed contiguously formed spaces (lower accommodating space (S21) and upper accommodating space (S22)) partitioned by laterally stretched coating film (W), is arranged such that the sticking region of the body to be coated is integrally exposed so as to be opposed to the adhesive face of the coating film, insides of the contiguously formed spaces are brought into a pressure reduced state and the coating film (W) is brought into a drawn down state where a portion is redundantly heated by a plurality of heaters and thereafter, the other space (upper accommodating space (S22)) where the body to be coated is not accommodated is released to an atmospheric pressure, thus instantaneously stretching and sticking the coating film onto the body to be coated.

Specifically, by serially performing following steps, the coating film is stuck throughout the over half periphery of the body to be coated in a cross-sectional view (in the embodiment, from the entire front surface to the peripheral side surfaces contiguously formed with the front surface, and the back surface).

(A) sealing step: the step of hermetically forming the contiguously formed spaces in such a manner that a lower chamber (21) which has a lower accommodating space (S21) having an upper portion thereof opened and accommodates the body to be coated (W) in the lower accommodating space (S21) and an upper chamber (22) which has the upper accommodating space (S22) having a lower portion thereof opened are vertically combined with each other in a state where the coating film (F) having a size enabling the coating film to cover both openings thus contiguously forming the upper and lower accommodating spaces (S21, S22) (FIG. 2).

(B) lifting up step: the step of accommodating the body to be coated (W) having the dimple (partial spherical indentation)-like three dimensionally formed portion in the accommodating space (S21), holding the body to be coated (W) by a holding portion (120) which is away from both of the dimple (partial spherical indentation)-like three dimensionally formed portion, and a side peripheral portion contiguously formed with a peripheral edge portion, and lifting up the holding portion (120) toward the accommodating space, thereby bringing the three dimensionally formed portion and the side peripheral portion contiguously formed with the peripheral edge portion of the body to be coated (W) to be integrally exposed in the accommodating space (S21) and closer to the coating film (not illustrated).

(C) pressure reducing and drawing down step: the step of reducing a pressure in the lower accommodating space (S21) of the sealed contiguously formed spaces and a pressure in the upper accommodating space (S22) of the sealed contiguously formed spaces while holding the pressure in the lower accommodating space and the pressure in the upper accommodating space at the same pressure, and bringing the coating film (F) into a drawn down state by application of a predetermined heat quantity, and bringing an uppermost portion of the sticking region of the body to be coated which is lifted up by the holding portion into a state where the uppermost portion approaches closest to a center portion of the stretched coating film (FIG. 3, and FIG. 10).

(D) sticking step: the step of integrally sticking the coating film (F) to the three dimensionally formed portion or the side peripheral portion of the body to be coated (W) by reducing pressures of the upper and lower accommodating space of the contiguously formed spaces while holding the pressures at the same pressure and then, releasing only inside of the upper accommodating space while to an atmospheric pressure.

(E) remaining stuck part (FE) removing step: The back surface stuck part (FF30) of the back surface is cut along a predetermined cut line (CL), and the cut back surface stuck part (FF30) and the remaining stuck part (FE) contiguously formed with the back surface stuck part are removed to coat only the front surface stuck part (FF1), the side surface stuck part (FF2), and a back surface cut stuck part (FF3) (FIGS. 5A-5B, FIG. 7, and FIG. 11).

(Three Dimension Overlay Apparatus)

A three dimension overlay apparatus in an embodiment illustrated in FIG. 2 to FIG. 4, FIG. 6, FIG. 7 is configured by a vacuum forming machine which can form contiguously formed spaces vertically sealed across the coating film (F) by a lower chamber (21) and an upper chamber (22) which approach or are separated from each other.

The lower chamber (21) has a lower accommodating space (S21) opened at an upper end, and embeds lower clamping parts (31) made of a hard elastic material, which clamp the coating film, on the inner side of an upper edge of a frame thereof. The upper chamber (22) has an upper accommodating space (S22) opened at a lower end thereof, and embeds upper clamping parts (32) made of a hard elastic material, which clamp the coating film, on the inner side of the upper edge of a frame thereof. The upper chamber (22) is supported upward by an arm (22A) so as to be vertically movable. The body to be coated (W) is accommodated in the lower chamber (21), the coating film (F) is installed in the upper opening, and the upper chamber (22) moves downward with the coating film (F) being clamped between the lower clamping parts (31) and the upper clamping parts (32), thereby achieving the pressure welded state where the chambers are combined with each other, and contiguously formed spaces across the coating film (F) are hermetically formed. In the set state, a tensile force to extend the coating film (F) to surroundings is applied (FIG. 2).

The holding portion (120) which holds the body to be coated (W) from the back surface (WB) is supported downward in the lower chamber (21) by an arm (11A) having an engaging body (11) at an upper end thereof (FIG. 2, and FIG. 9). The holding portion (120) is formed by combining a holding surface formed along the back surface (WB) of the body to be coated (W) with a recessed surface dented downward from the periphery of the holding surface. A rising part (120S) which extends upward from the periphery of the recessed surface is formed. The rising part (120S) falls within a cut frame of the body to be coated, and extends upward from the cut frame of the body to be coated in the holding state.

In particular, the rising part (120S) in Embodiment 2 is in contact with the inner side of the lower chamber (21) (FIG. 6, FIG. 7).

The holding portion (120) in the embodiment brings the body to be coated (W) in surface-contact with the centrally-projecting holding surface to hold the body to be coated (W), and in this state, its lower portion is engaged and supported with the engaging body (11). The arm (11A) coupled to the lower end of the engaging body (11) is moved by a driving mechanism (10), thereby moving the holding portion (120) upward, and bringing the coating film (F) close to the center portion of the stuck surface of the body to be coated (W) (FIG. 2).

In the set state where the lower chamber (21) opened at the upper end is vertically combined with the upper chamber (22) opened at the lower end, the contiguously formed spaces is hermetically formed across the coating film (F), and the lower chamber (21) and the upper chamber (22) are communicatively provided with pressure control means which controls a pressure in each of the upper and lower spaces constituting the contiguously formed spaces. Specifically, the pressure control means has a pipe structure including a lower communicating pipe (41) which communicates with a side of the lower chamber, an upper communicating pipe (42) which communicates with a side of the upper chamber, a coupling pipe (44) which couples the lower communicating pipe (42) to the upper communicating pipe (42), an upper connecting pipe (45) which connects the coupling pipe (44) to a vacuum chamber (6) at an upper end, and connects the coupling pipe (44) to a pressure control mechanism (5) at a lower end, in which the pressure control mechanism (5) and the vacuum chamber (6) are connected to the pipe structure (FIG. 6).

The three dimension overlay apparatus in Embodiment 3 represented in FIG. 8 includes a receiving jig (including a bottom frame plate (11) and a side frame plate (lower clamping part (31)) which is formed of a recessed receiving body covering a side periphery from the inner side of a predetermined partial formed portion (WP) of the body to be coated (W), and is opened at an upper end along the upper opening edge of the lower chamber (21) when in a pre-set state (SA), a lower chamber (21) in which the receiving jig covering a portion of the predetermined formed portion (WP) of the body to be coated (W) can be arranged close to the upper opening, with the body to be coated (W) being stored in the accommodating space, an upper chamber (22) which is arranged in a space above the lower chamber (21) to be vertically movable, and brings the lower opening of the accommodating space into contact with the upper opening of the lower chamber (21) across the coating film (F) in the lowest state, and pressure control means which controls pressures in the upper accommodating space (S22) in the upper chamber (22), and a lower space (11S) in the receiving jig fixedly arranged in the lower chamber (21).

In Embodiment 3, by arranging the receiving upper end of the receiving jig which covers a portion of the body to be coated (W) close to the upper opening in the lower chamber (21), the lower chamber (21) is partitioned into the lower space (11S) in the receiving jig and the accommodating space (S21), the partitioned lower space (11S) in the receiving jig and upper accommodating space (S22) in the upper chamber (22) are vertically contiguously formed across the coating film (F) in a sealed manner, pressures in the lower space (11S) in the sealed receiving body and the upper accommodating space (S22) each are reduced and then, only the pressure in the upper accommodating space (S22) is released, and the coating film (F) is overlain on a portion of the body to be coated (W) covered with the receiving jig (FIG. 8).

(Pressure Reducing and Drawing Down Step)

In the pressure reducing and drawing down step, pressures in the lower accommodating space (S21) and the upper accommodating space (S22) of the sealed contiguously formed spaces are reduced while the pressures are held at the same pressure, and bringing the coating film (F) into a drawn down state by application of a predetermined heat quantity, and bringing an uppermost portion of the sticking region of the body to be coated which is lifted up by the holding portion into a state where the uppermost portion approaches closest to a center portion of the stretched coating film. Through this step, the coating film (F) before sticking is brought into the drawn down state (DD) where the coating film (F) is thermally stretched by application of the predetermined heat quantity.

A heat quantity (t1) applied to a center part to be stuck (center area A1) which covers a center portion (the uppermost portion in the set state) of the surface of the body to be coated, in the coating film (F) brought into the drawn down state through this step is set to be lower than a heat quantity (t2) applied to a peripheral part to be stuck (peripheral area A2) that covers the peripheral portion, the side surface, or the back surface (the peripheral portion other than the uppermost portion in the set state) of the surface of the body to be coated (FIG. 3).

In the embodiment, heaters for radiation heating include the center heaters (220H) disposed at the center of an inner top surface of the upper chamber (22), the peripheral heaters (221H) disposed near a corner of the inner top surface of the upper chamber (22) and around the center heaters (220H), and the side heater (222H) disposed on the inner side surface of the upper chamber (22). Then, radiation heating ranges of the adjacent peripheral heaters (221H) or radiation heating ranges of the peripheral heater (221H) and the side heater (222H) are set so as to overlap each other (FIG. 3). In the coating film (F), the peripheral part to be stuck (peripheral area A2) which coincides with the overlapping radiation heating ranges of the peripheral heater (221H) and the side heater (222H) is radiation-heated with the predetermined peripheral heat quantity (t2).

On the contrary, the radiation heating ranges of the adjacent center heater (220H) and peripheral heater (221H) are set so as not to overlap each other (FIG. 3). In the coating film (F), the center part to be stuck (center area A1) which coincides with the radiation heating range of the center heater (220H) is radiation-heated in the radiation heating range of the center heater (220H) with the predetermined center heat quantity (t1). The center heat quantity (t1) is set to be lower than the peripheral heat quantity (t2).

(Rising Part (120E))

In the forming step, a rising part (120E) which protrudes toward the coating film (F) with a protruding height that is higher than a maximum height of the body to be coated (W) is provided on the outer side of the set body to be coated (W), and the rising part (120E) contacts the coating film (F) earlier than the body to be coated (W) and is brought into a frame contact state on the outer side of the body to be coated (W), where the rising part pushes the coating film (F) to stretch the coating film (F), thereby sticking the body to be coated (W) to the stretched coating film (F). In this case, since the rising frame which protrudes toward the coating film (F) with the protruding height that is higher than the maximum height of the body to be coated (W) is provided on the outer side of the formed portion WP of the set body to be coated (W), the rising frame contacts the coating film (F) earlier than the body to be coated (W) when causing the coating film (F), to approach and pushes the coating film (F) upward to stretch the coating film (F).

(Lower Chamber (21))

The lower chamber (21) can accommodate the whole body to be coated (W) in the accommodating space, and can also accommodate the receiving jig covering the predetermined formed portion WP of the body to be coated (W) along with the body to be coated in the accommodating space (S21), the receiving jig being arranged close to the upper opening.

The body to be coated (W) is formed of a three dimensional formed plate having a plurality of opening formed portions, and the side surface (WS) is exposed through the opening formed portions. The front surface (WF) and the back surface (WB) which are contiguously formed with the side surface (WS) are exposed. The coating film (F) is integrally stuck from the front surface (WF) to the back surface (WB) through the side surface (WS). In the sticking region, the coating film is largely stretched on the side surface (WS) and the back surface (WB) by three dimensional overlay, and becomes thinner as it approaches the back surface. By cutting the tinned portion along the cut line (CL), adhesiveness of the back side of the formed portion can be improved.

(Pressure Adjusting Step)

A pressure adjusting step includes a pressure reducing step of reducing each of the upper and lower formed spaces partitioned by the coating film (F) which covers the body to be coated (W), and a pressurizing step of pressurizing only the upper formed space after the pressure reducing step. The heating step heats the coating film (F) from the inside of the upper formed space in the former pressure reducing step. In a forming step, a table is raised from the inside of the lower formed space in the latter pressurizing step, to cover the body to be coated (W) with the coating film (F).

According to the present invention, the heaters 2201H, 221H, and 222H which are a plurality of heating elements are aligned on the inner surface of the upper chamber (22), achieving a vacuum forming apparatus which is not susceptible to outside air.

(Air Resistance Reducing Property)

The body to be coated (W) is a moving body with movement during use, and a dimple (partial spherical indentation)-like three dimensionally formed portion is formed in an exposed manner on a portion of the whole surface, which receives fluid frictional resistance during the movement of the moving body. This is preferable for reliably reducing air resistance.

(Drawn Down State)

The coating film (F) before sticking is brought into the drawn down state as illustrated in FIG. 3 by application of a predetermined heat quantity, the coating film (F) is brought into a stuck state with the body to be coated by a pressure difference between sealed spaces above and below the coating film from the drawn down state, and in the coating film (F) in the drawn down state, the heat quantity (t1) applied to the center part to be stuck (center area A1) of the dimpled portion is set to be lower than the heat quantity (t2) applied to the peripheral part to be stuck (peripheral area A2). Thus, the side peripheral portion has a larger thermal plasticity than the center portion, and the film in the side peripheral portion extends further than the film in the center portion after the three dimension overlay method.

Embodiment 2

On a coating film before sticking in Embodiment 2 as illustrated in FIGS. 5A to 6, a plurality of partially circular recessed portions FD which are thinner or thicker than the other portion are previously formed on the part to be stuck, and the thickness varied portions are formed as dimples that are smaller than the dimples (D) as the recessed portions of the three dimensionally formed portion, and are formed in a regular array at a pitch equal to or smaller than an arrangement pitch of the dimples (D) that are recessed portions of the three dimensionally formed portion.

Embodiment 3

In a forming apparatus in Embodiment 3 illustrated in FIG. 8, a lower chamber (21) having an upper portion thereof opened and an upper chamber (22) having a lower portion thereof opened are vertically combined with each other across the coating film (F), the upper accommodating space 21S and the lower accommodating space 22S are contiguously formed in a sealed manner, and pressures in the upper space and the lower space each are controlled, thereby sticking the coating film (F) to a portion of the surface of the body to be coated (W) accommodated in the formed spaces, in the pressure-reduced state. The lower chamber (21) is formed of a recessed receiving jig which covers the side periphery of the predetermined partial formed portion WP of the body to be coated (W) from the inside of the portion, and only the portion surrounded with the receiving jig is partially vacuum-formed.

The bottom frame plate 11 is formed of a plate-shaped stepped portion 11E having thinned front and rear ends, and a three dimensional forming die 12 corresponding to the three-dimensional shape of the protruding portion protruding bottom frame plate 11 is formed on the plate face. In a second set state (SB1) where the recessed receiving jig covers the predetermined formed portion WP, the forming die 12 contacts the back side of the predetermined formed portion WP. Opened bottom holes 50 are contiguous with bottoms of two respective upper openings 10, and vertically penetrate. Other configuration and forming method that are not described are the same as those in Embodiment 1.

Embodiments 4, 5

In the coating film in Embodiments 4, 5 illustrated in FIG. 10 to FIG. 13B, as in embodiment 3, a plurality of thickness varied portions which are formed into a partially circular shape with a thickness smaller and larger than thickness of other portions are preliminarily formed at least at the part to be stuck of the coating film before sticking Especially in Embodiment 4, as illustrated in FIG. 10, recessed portions FD that are minute indentations are regularly formed only on the surface of the coating film, and the coating film is heated from above such that the recessed surfaces of the recessed portions FD are thermally plasticized. Therefore, the coating film is susceptible to the heat quantity, and the center area A1 and the peripheral area A2 of the coating film can be brought into different drawn states. In FIG. 10, the coating film is radiation heated such that the peripheral area A2 stretches thinner and larger than the center area A1, and is drawn down in two stages with the boundary between the center area A1 and the peripheral area A2.

Especially in Embodiment 5, the coating film illustrated in FIG. 12C is used, projecting portions are formed only on a sticking surface FA as a lower surface, and lenticular lenses LR are formed on a front surface. According to steps of the three dimension overlay method illustrated in FIGS. 13A and 13B, the projecting portions on the lower surface of the coating film stretch, and are deformed along the surface of the body to be coated to stick to the surface of the body to be coated. The projecting portions FT having a size corresponding to the projecting portions on the lower surface are regularly arranged on the surface of the stuck coating film without deforming the lenticular lenses LR (FIG. 13B).

In FIG. 12B illustrating another example of the coating film in Embodiment 5, a plurality of large projecting portions FT1 and a plurality of small projecting portions FT2, as the thickness varied portions, are arranged on the back surface and the front surface of the coating film, respectively. The thickness varied portions are arranged alternately and regularly so as not to overlap each other.

Embodiment 6

Figure 15:
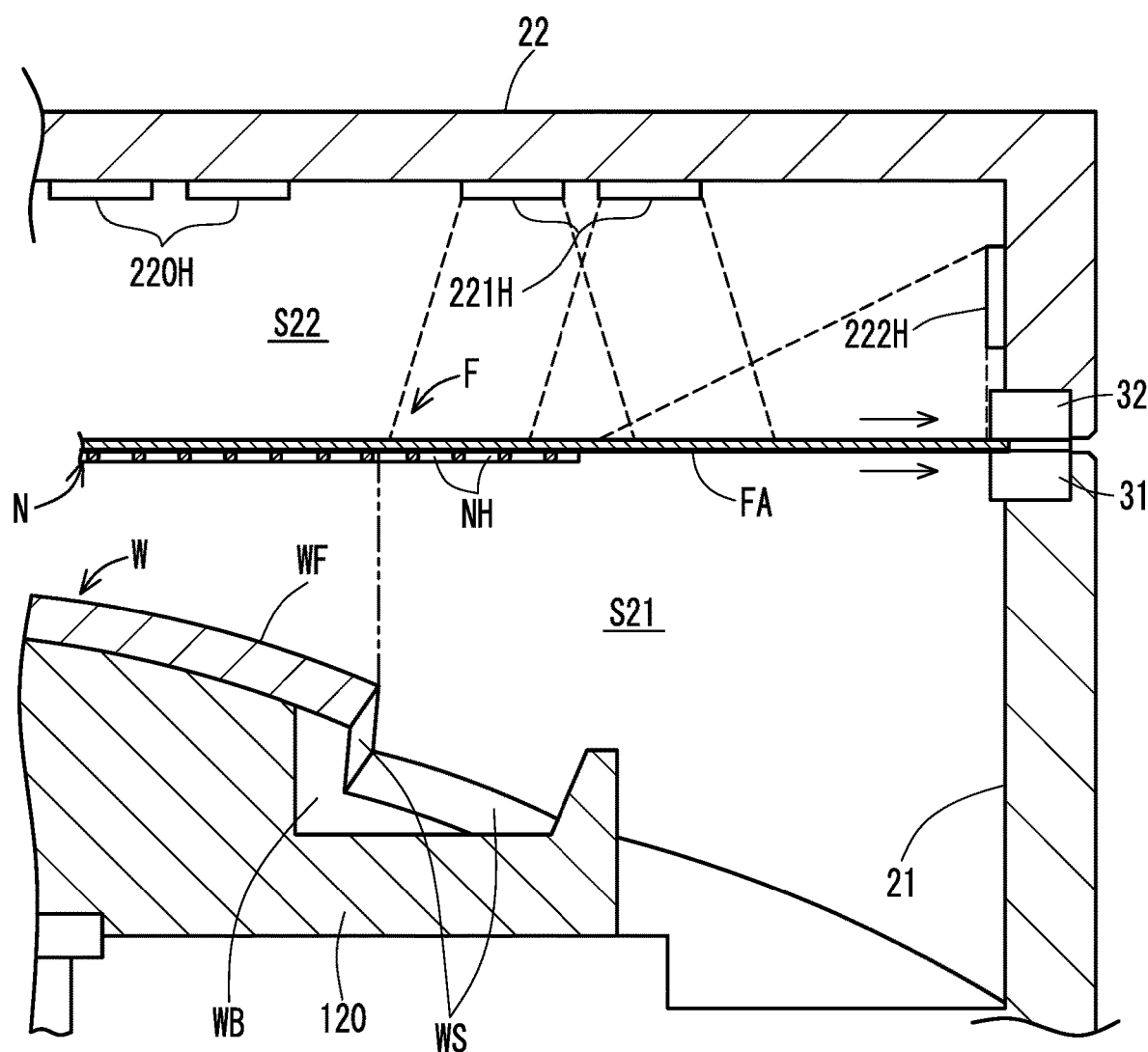
FIG. 15 is an enlarged sectional view illustrating a set state before the coating film according to the surface protection or surface decoration method in Embodiment 6.
Figure 16:
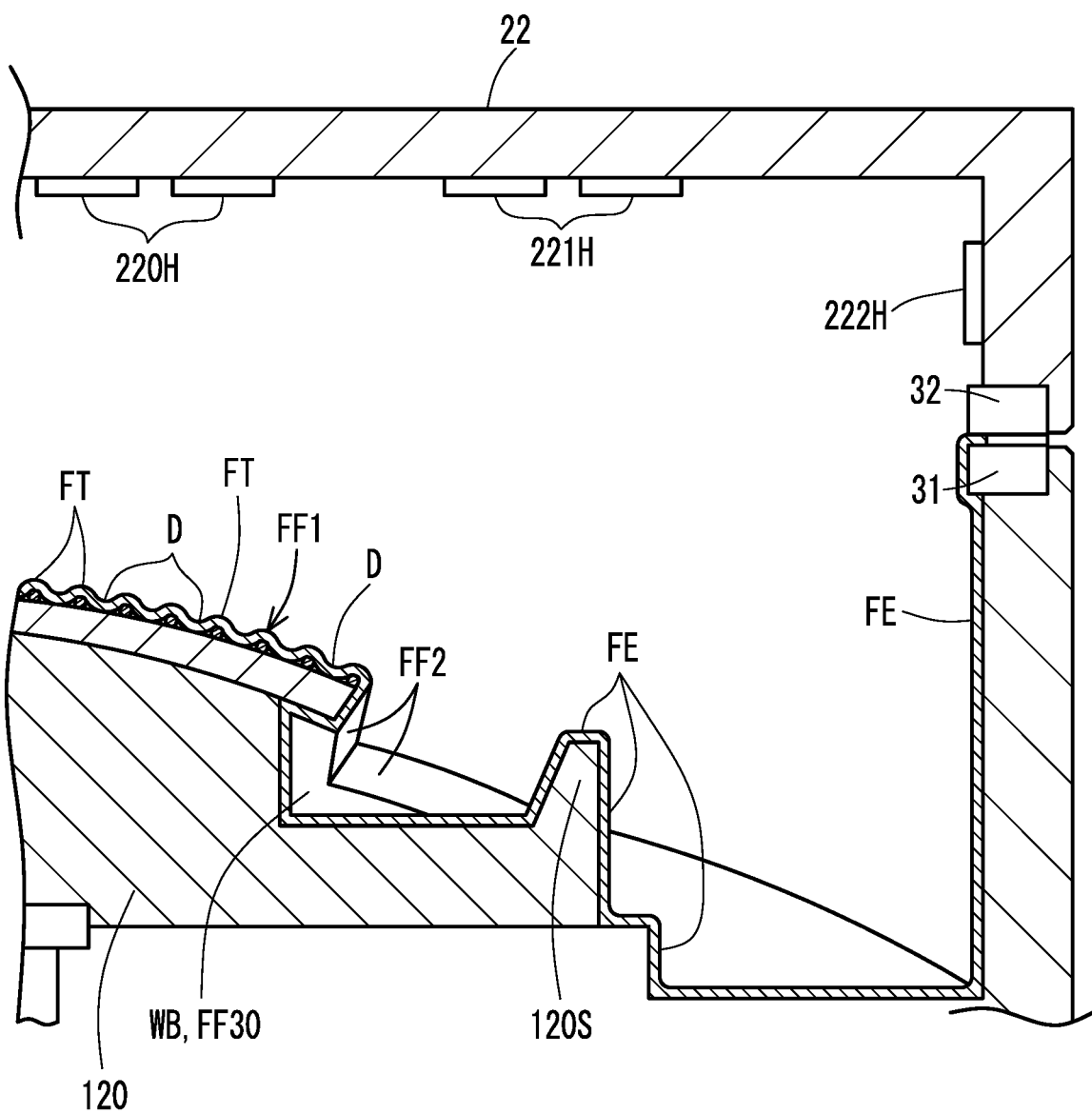
FIG. 16 is an enlarged sectional view illustrating a finished state after sticking of the coating film according to the surface protection or surface decoration method in Embodiment 6.

According to a surface decoration method for the body to be coated in Embodiment 6 illustrated in FIG. 14 to FIG. 16, a thermoplastic coating film having a larger area than a predetermined sticking region of the body to be coated is integrally stuck to the sticking region.

By interposing a mesh sheet (N), in which a plurality of openings NH are regularly arranged, between the coating film and the body to be coated to perform three dimension overlay, the coating film (F) is integrally stuck throughout the over half periphery of the body to be coated including the sticking region in a cross-sectional view, and a three dimensionally formed portion on which a plurality of recessed portions corresponding to the openings of the mesh sheet are arranged in a regular manner is formed in at least a portion of the sticking region.

Thereby, since the thickness varied portions are formed along the thickness of the mesh sheet and the shape of the openings NH, size of the thickness varied portions formed by surface decoration or surface protection can be readily controlled. For example, when the recessed portions are formed on the surface of the coating film as in Embodiment 4 (FIG. 10), depth and dimension of the recessed portions are limited by the base material of the coating film, making it difficult to form the thickness varied portions which are deeper than the thickness of the coating film. In Embodiment 5 (FIGS. 13A and 13B) and variations of the coating film (FIGS. 12A to 12C) employed in Embodiment 5, thermoplastic response of the projecting portions FT may partially degrade, and stretching adhesiveness of the projecting portions may become unstable. On the contrary, by arranging the mesh sheet N on the lower surface of the coating film or the upper surface of the body to be coated and performing steps of the three dimension overlay method, the drawn down amount can be reliably controlled in each of various areas such as a center area and a middle area (FIG. 15), and the forming range of the thickness varied portions can be freely controlled, for example, by forming the thickness varied portions only in the center area (FIG. 15, FIG. 16).

Figure 17A:
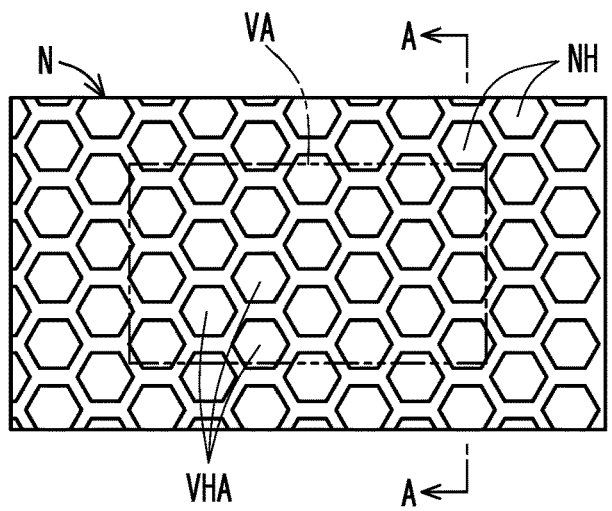
FIGS. 17A to 17C are partial enlarged views and sectional views of a mesh sheet used in the surface protection or surface decoration method in Embodiment 6.
Figure 17A:
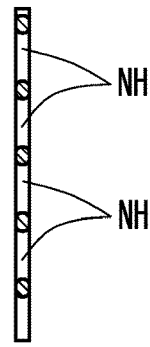
Figure 17B:
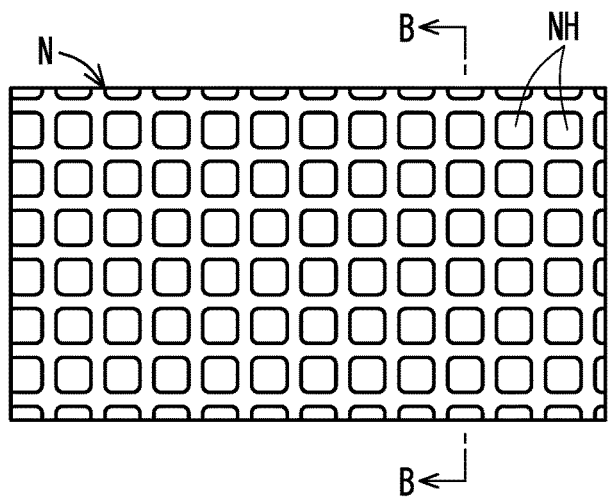
Figure 17B:
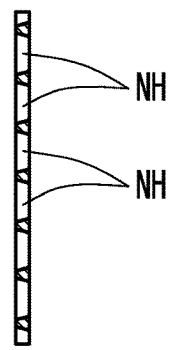
Figure 17C:
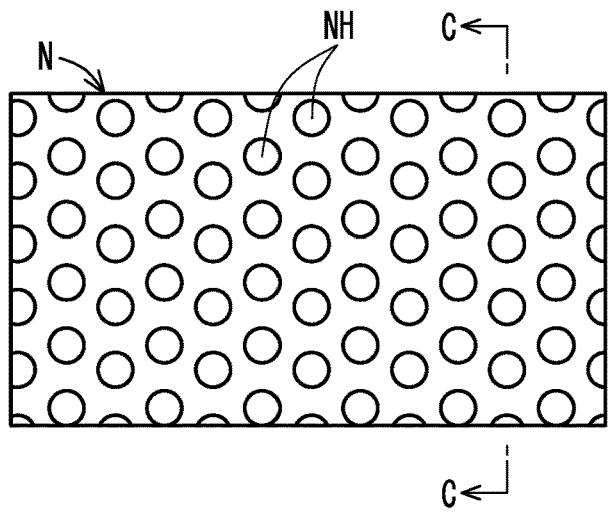
Figure 17C:
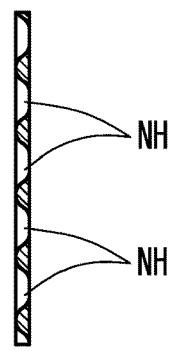

FIGS. 17A to 17C illustrate examples (variations) of the mesh sheet N used in the surface protection method or the surface decoration method in Embodiment 6. In FIG. 17A, octagonal openings NH are displaced from one another by half-width and half-height to form a honeycomb structure, and a mesh body connecting the openings NH to each other has a circular cross section. In FIG. 17B, chamfered rectangular openings NH are regularly arranged lengthwise and crosswise, and a mesh body connecting the openings NH to each other has a mountain-like trapezoidal cross section having a front side that is narrower than a back side. In FIG. 17C, partial spherical openings NH are spaced at a predetermined distance, and a mesh body connecting the openings NH to each other has a mountain-like wavy (sine curve) cross section.

For example, by hollowing out only a predetermined range VA of the mesh sheet N in FIG. 17A, cutting another mesh sheet N as illustrated in FIG. 17B and FIG. 17C according to the predetermined range VA, and combining the mesh sheets, shape, size, and the number of a group of predetermined openings VHA in the predetermined range VA can be freely controlled.

Figure 18:
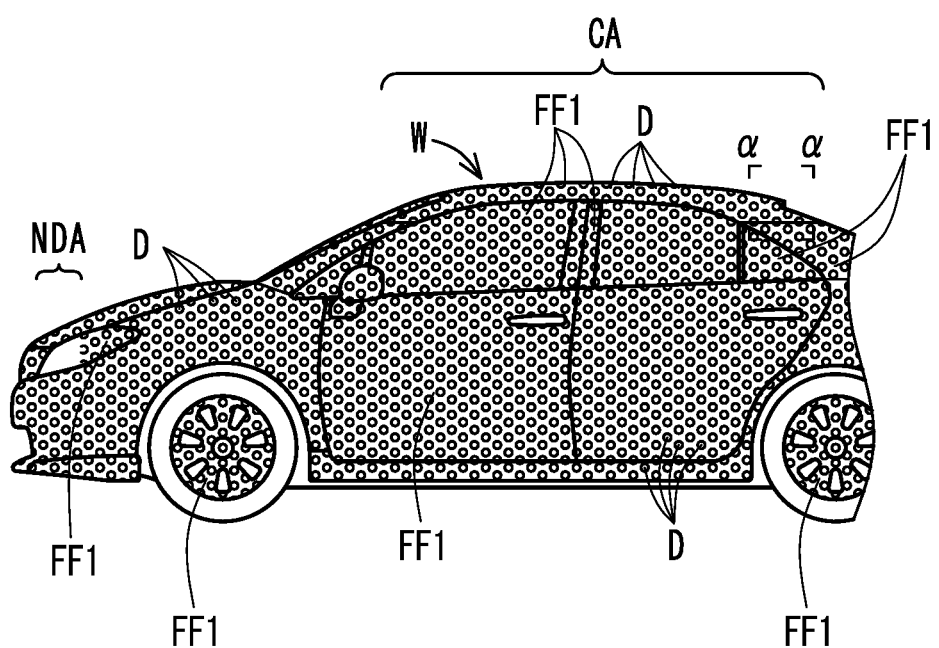
FIG. 18 is a view illustrating another embodiment in which the surface protection or surface decoration method of the present invention is applied to each part of a vehicle.

FIG. 18 illustrates another embodiment in which the surface decoration method of the present invention is applied to each part of a vehicle. In the embodiment in FIG. 1, a range acquired by eliminating a predetermined height range including an A pillar, a B pillar, and a C pillar from the film decoration range is set as the non-decoration range (NDA). However, in the embodiment in FIG. 18, the A pillar, the B pillar, and the C pillar are included in the decoration range, and the surface of a vehicle pane, a transparent cover of a headlight, and wheel covers are also included in the decoration range. In the case of decorating the vehicle pane, a polarizing see-through film through which the inside can be seen from only one side is used as the coating film. After the polarizing see-through film is decorated on the pane, one cannot view the inside from the outside of the vehicle due to reflection, and can view the outside from the inside of the vehicle.

Effects of Embodiments

1. The coating film is fixed onto the three-dimensional outer plate having a lot of dimples (recessed portions indentations having a diameter of a few mm) on the surface thereof by the steps of the three dimension overlay method which can control the drawn down amount of the coating film, to form regular thickness varied portions in the fixed state. Unlike spraying, resin accumulation is not generated, forming a uniform surface protective layer. Air frictional resistance on the surface can be reduced by forming the regular thickness varied portions to achieve smooth appearance.

2. The "flat" coating film is fixed in the thermoplastic state along the mesh sheet N having desired thickness varied portions or the recessed portions on the surface of the body to be coated by the three dimension overlay method (the method of sticking a film by reducing a pressure in one of two contiguous sealed spaces with the film interposed therebetween). This can uniformly form the surface protective layer having thickness varied portions of predetermined size, number, and depth without deforming dimples.

3. The coating film "on which thickness varied portions having fine recess and projections are formed thereon" is laminated on the dimpled surface by a three dimension overlay method. The uniform surface protective layer can be formed while a dimple effect is enhanced.

4. By fixing the coating film having the thickness varied portions through overlay for surface protection, peripheral parts of the projecting portions or the recessed portions protect the body to be coated with a predetermined thickness, thereby ensuring weather resistance.

5. By fixing the coating film having the thickness varied portions through overlay for surface protection, the body to be coated which includes the projecting portions or the recessed portions, or has a predetermined pattern formed by surface processing of the coating film can be integrated with the coating film, to realize a new body to be coated having regularly arranged thickness varied portions or thickness varied portions with plural types of regular arrangements.

6. By controlling size of the thickness varied portions, air resistance can be decreased or increased during high-speed travelling, and a predetermined surface can be adjusted in shape, for example, by partially forming irregularities on the surface.

The present invention is not limited to the above-described embodiments, and various changes, such as extraction of some elements, replacement of any element in a certain element with the element in the other embodiments or equivalents, omission of any element in the embodiments, and combination of elements in different embodiments, may be made within the scope of the present invention.

DESCRIPTION OF REFERENCE SIGNS

21S: Lower accommodating space
22S: Upper accommodating space
F: Coating film
WP: Formed portion
W: Body to be coated
D: thickness varied portion
A1: Center area (center part to be stuck)
A2: Peripheral area (peripheral part to be stuck)
21: Lower chamber
22: Upper chamber

The invention claimed is:

1. A surface protection method for a body to be coated, comprising integrally sticking a thermoplastic coating film larger in area than a predetermined sticking region of the body to be coated in accordance with a three dimension overlaying process, wherein
the three dimension overlaying process is performed with a reticular sheet having a plurality of regularly arrayed openings being sandwiched between the coating film and the body to be coated, an entire periphery of at least one of the plurality of openings is entirely surrounded by the reticular sheet,
integrally sticking the coating film throughout an over half periphery of the body to be coated including the sticking region in a cross-sectional view, and
forming, at least a portion of the sticking region, a three dimensionally formed portion that has a plurality of regularly arrayed recessed portions corresponding to the openings in the reticular sheet, and
wherein the reticular sheet connecting the plurality of regularly arrayed openings to each other has at least one of a sinusoidal cross section when viewed along the plane of the reticular sheet, or a circular cross section when viewed along the plane of the reticular sheet.

2. The surface protection method for the body to be coated according to claim 1, wherein
the predetermined sticking region includes the whole three dimensionally formed portion, and extends throughout the over half periphery of the body to be coated in a center cross-sectional view,
in the three dimension overlaying process,
the body to be coated is accommodated in one of two contiguously formed spaces partitioned by the coating film, the sticking region is disposed to be integrally exposed, both contiguously formed spaces are brought into a pressure reduced state and thereafter, the other space accommodating no body to be coated is released to an atmospheric pressure, thus sticking the coating film onto a surface of the body to be coated, whereby
the coating film is integrally stuck throughout the over half periphery of the body to be coated including the sticking region in a cross-sectional view.

3. The surface protection method for the body to be coated according to claim 1, wherein
the body to be coated is a moving body that has a curved plate-shaped portion and is movable during use,
the three dimensionally formed portion includes a plurality of exposed dimples on the plate surface of the curved plate-shaped portion of the body to be coated, the dimples being arrayed in areas subjected to fluid frictional resistance during movement, and
the sticking region to which the coating film is stuck is a continuous face region that includes the plate surface, a plate side surface contiguously formed with a peripheral portion of the plate surface, and a portion of a plate back surface contiguously formed with the plate side surface.

4. The surface protection method for the body to be coated according to claim 2, wherein
in the three dimension overlaying process,
contiguously formed spaces are formed above and below the coating film with the laterally extended coating film being set as a boundary,
the body to be coated is accommodated in the lower accommodating space of the contiguously formed spaces, and an upper accommodating space of the contiguously formed spaces is released to an atmospheric pressure,
a predetermined heat quantity is applied to the coating film before the upper accommodating space is released to the atmospheric pressure, to bring the coating film into a drawn-down state where the coating film draws near the three dimensionally formed portion of the body to be coated,
the coating film is transitioned from the drawn-down state to a stuck state due to a pressure difference between the sealed spaces above and below the coating film, and
in the coating film in the drawn-down state, a portion to be stuck to a center portion of the three dimensionally formed portion receives a smaller heat quantity than a portion to be stuck to a peripheral portion of the three dimensionally formed portion.

5. The surface protection method according to claim 1, wherein
the three dimension overlay process includes at least following steps:
sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

6. The surface protection method for the body to be coated according to claim 1, wherein a plurality of circular thickness-variable portions thinner or thicker than remaining portions are preliminarily formed at least at the part to be stuck of the coating film before sticking, and the thickness-variable portions are regularly arrayed in the same pitch as or a smaller pitch than the pitch of the plurality of regularly arrayed openings in the reticular sheet.

7. The surface protection method for the body to be coated according to claim 2, wherein the body to be coated is a moving body that has a curved plate-shaped portion and is movable during use, the three dimensionally formed portion includes a plurality of exposed dimples on the plate surface of the curved plate-shaped portion of the body to be coated, the dimples being arrayed in areas subjected to fluid frictional resistance during movement, and the sticking region to which the coating film is stuck is a continuous face region that includes the plate surface, a plate side surface contiguously formed with a peripheral portion of the plate surface, and a portion of a plate back surface contiguously formed with the plate side surface.

8. The surface protection method for the body to be coated according to claim 7, wherein in the three dimension overlaying process, contiguously formed spaces are formed above and below the coating film with the laterally extended coating film being set as a boundary, the body to be coated is accommodated in the lower accommodating space of the contiguously formed spaces, and an upper accommodating space of the contiguously formed spaces is released to an atmospheric pressure, a predetermined heat quantity is applied to the coating film before the upper accommodating space is released to the atmospheric pressure, to bring the coating film into a drawn-down state where the coating film draws near the three dimensionally formed portion of the body to be coated, the coating film is transitioned from the drawn-down state to a stuck state due to a pressure difference between the sealed spaces above and below the coating film, and in the coating film in the drawn-down state, a portion to be stuck to a center portion of the three dimensionally formed portion receives a smaller heat quantity than a portion to be stuck to a peripheral portion of the three dimensionally formed portion.

9. The surface protection method according to claim 2, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

10. The surface protection method according to claim 3, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

11. The surface protection method according to claim 4, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

12. The surface protection method for the body to be coated according to claim 2, wherein a plurality of circular thickness-variable portions thinner or thicker than remaining portions are preliminarily formed at least at the part to be stuck of the coating film before sticking, and the thickness-variable portions are regularly arrayed in the same pitch as or a smaller pitch than the pitch of the plurality of regularly arrayed openings in the reticular sheet.

13. The surface protection method for the body to be coated according to claim 3, wherein a plurality of circular thickness-variable portions thinner or thicker than remaining portions are preliminarily formed at least at the part to be stuck of the coating film before sticking, and the thickness-variable portions are regularly arrayed in the same pitch as or a smaller pitch than the pitch of the plurality of regularly arrayed openings in the reticular sheet.

14. The surface protection method for the body to be coated according to claim 4, wherein a plurality of circular thickness-variable portions thinner or thicker than remaining portions are preliminarily formed at least at the part to be stuck of the coating film before sticking, and the thickness-variable portions are regularly arrayed in the same pitch as or a smaller pitch than the pitch of the plurality of regularly arrayed openings in the reticular sheet.

15. A surface decoration method for a body to be coated where a thermoplastic coating film having a larger area than a predetermined sticking region of the body to be coated is integrally stuck to the sticking region in accordance with a three dimension overlaying process, wherein the three dimension overlaying process is performed with a reticular sheet having a plurality of regularly arrayed openings being sandwiched between the coating film and the body to be coated, an entire periphery of at least one of the plurality of openings is entirely surrounded by the reticular sheet, to integrally stick the coating film throughout an over half periphery of the body to be coated including the sticking region in a cross-sectional view, and to form, at least a portion of the sticking region, a three dimensionally formed portion that has a plurality of regularly arrayed recessed portions corresponding to the openings in the reticular sheet, and wherein the reticular sheet connecting the plurality of regularly arrayed openings to each other has at least one of a sinusoidal cross section when viewed along the plane of the reticular sheet, or a circular cross section when viewed along the plane of the reticular sheet.

16. The surface decoration method for the body to be coated according to claim 15, wherein the predetermined sticking region includes the whole three dimensionally formed portion, and extends throughout the over half periphery of the body to be coated in a center cross-sectional view, in the three dimension overlaying process, the body to be coated is accommodated in one of two contiguously formed spaces partitioned by the coating film, the sticking region is disposed to be integrally exposed, both contiguously formed spaces are brought into a pressure reduced state and thereafter, the other space accommodating no body to be coated is released to an atmospheric pressure, thus sticking the coating film onto a surface of the body to be coated, whereby the coating film is integrally stuck throughout the over half periphery of the body to be coated including the sticking region in a cross-sectional view.

17. The surface decoration method for the body to be coated according to claim 15, wherein the body to be coated is a moving body that has a curved plate-shaped portion and is movable during use, the three dimensionally formed portion includes a plurality of exposed dimples on the plate surface of the curved plate-shaped portion of the body to be coated, the dimples being arrayed in areas subjected to fluid frictional resistance during movement, and the sticking region to which the coating film is stuck is a continuous face region which includes the plate surface, a plate side surface contiguously formed with a peripheral portion of the plate surface, and a portion of a plate back surface contiguously formed with the plate side surface.

18. The surface decoration method for the body to be coated according to claim 16, wherein in the three dimension overlaying process, contiguously formed spaces are formed above and below the coating film with the laterally extended coating film being set as a boundary, the body to be coated is accommodated in the lower accommodating space of the contiguously formed spaces, and an upper accommodating space of the contiguously formed spaces is released to an atmospheric pressure, a predetermined heat quantity is applied to the coating film before the upper accommodating space is released to the atmospheric pressure, to bring the coating film into a drawn-down state where the coating film draws near the three dimensionally formed portion of the body to be coated, the coating film is transitioned from the drawn-down state to a stuck state due to a pressure difference between the sealed spaces above and below the coating film, and in the coating film in the drawn-down state, a portion to be stuck to a center portion of the three dimensionally formed portion receives a smaller heat quantity than a portion to be stuck to a peripheral portion of the three dimensionally formed portion.

19. The surface decoration method according to claim 15, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

20. The surface decoration method for the body to be coated according to claim 15, wherein a plurality of circular thickness-variable portions thinner or thicker than remaining portions are preliminarily formed at least at the part to be stuck of the coating film before sticking, the thickness-variable portions are regularly arrayed in the same pitch as or a smaller pitch than the pitch of the plurality of regularly arrayed openings in the reticular sheet.

21. The surface decoration method for the body to be coated according to claim 16, wherein the three body that has a curved plate-shaped portion and is movable during use, the three dimensionally formed portion includes a plurality of exposed dimples on the plate surface of the curved plate-shaped portion of the body to be coated, the dimples being arrayed in areas subjected to fluid frictional resistance during movement, and the sticking region to which the coating film is stuck is a continuous face region which includes the plate surface, a plate side surface contiguously formed with a peripheral portion of the plate surface, and a portion of a plate back surface contiguously formed with the plate side surface.

22. The surface decoration method for the body to be coated according to claim 21, wherein in the three dimension overlaying process, the contiguously formed spaces are formed above and below the coating film with the laterally extended coating film being set as a boundary, the body to be coated is accommodated in the lower accommodating space of the contiguously formed spaces, and an upper accommodating space of the contiguously formed spaces is released to an atmospheric pressure, a predetermined heat quantity is applied to the coating film before the upper accommodating space is released to the atmospheric pressure, to bring the coating film into a drawn-down state where the coating film draws near the three dimensionally formed portion of the body to be coated, the coating film is transitioned from the drawn-down state to a stuck state due to a pressure difference between the sealed spaces above and below the coating film, and in the coating film in the drawn-down state, a portion to be stuck to a center portion of the three dimensionally formed portion receives a smaller heat quantity than a portion to be stuck to a peripheral portion of the three dimensionally formed portion.

23. The surface decoration method according to claim 16, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

24. The surface decoration method according to claim 17, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

25. The surface decoration method according to claim 18, wherein the three dimension overlay process includes at least following steps:

sealing step: a step of vertically combining a lower chamber that has a lower accommodating space opened at the top and accommodates the body to be coated in the lower accommodating space with an upper chamber having an upper accommodating space opened at the bottom, with the coating film covering both openings being sandwiched between, to hermetically form the continuously formed spaces consisting of the upper and lower accommodating spaces, lifting up step: a step of holding the body to be coated accommodated in the accommodating space with a holding portion located away from both of the sticking region and a side peripheral portion contiguously formed with a peripheral edge portion, and lifting up the body to be coated toward the upper accommodating space by driving the holding portion, pressure reducing and drawing down step: a step of reducing the pressure in the lower accommodating space and the upper accommodating space of the sealed contiguously formed spaces while keeping the same pressure in the both spaces, and applying a predetermined heat quantity to the coating film to bring the coating film into a drawn-down state where an uppermost portion of the sticking region of the body to be coated lifted up by the holding portion draws nearest the extended coating film, and sticking step: a step of releasing only the upper accommodating space out of the pressure-reduced upper and lower accommodating spaces to an atmospheric pressure to integrally stick the coating film to the sticking region or the side peripheral portion of the body to be coated.

26. The surface decoration method for the body to be coated according to claim 16, wherein a plurality of circular thickness-variable portions thinner or thicker than remaining portions are preliminarily formed at least at the part to be stuck of the coating film before sticking, the thickness-variable portions are regularly arrayed in the same pitch as or a smaller pitch than the pitch of the plurality of regularly arrayed openings in the reticular sheet.

27. The surface decoration method for the body to be coated according to claim 17, wherein a plurality of circular thickness-variable portions thinner or thicker than remaining portions are preliminarily formed at least at the part to be stuck of the coating film before sticking, the thickness-variable portions are regularly arrayed in the same pitch as or a smaller pitch than the pitch of the plurality of regularly arrayed openings in the reticular sheet.

28. The surface decoration method for the body to be coated according to claim 18, wherein a plurality of circular thickness-variable portions thinner or thicker than remaining portions are preliminarily formed at least at the part to be stuck of the coating film before sticking, the thickness-variable portions are regularly arrayed in the same pitch as or a smaller pitch than the pitch of the plurality of regularly arrayed openings in the reticular sheet.

* * * * *